(12) United States Patent
Sasaki et al.

(10) Patent No.: US 11,297,070 B2
(45) Date of Patent: Apr. 5, 2022

(54) COMMUNICATION APPARATUS, SYSTEM, METHOD, AND NON-TRANSITORY MEDIUM

(71) Applicant: NEC Corporation, Tokyo (JP)

(72) Inventors: Takayuki Sasaki, Tokyo (JP); Daniele Enrico Asoni, Zurich (CH); Adrian Perrig, Zurich (CH)

(73) Assignee: NEC CORPORATION, Tokyo (JP)

( * ) Notice: Subject to any disclaimer, the term of this patent is extended or adjusted under 35 U.S.C. 154(b) by 455 days.

(21) Appl. No.: 16/334,405

(22) PCT Filed: Sep. 20, 2016

(86) PCT No.: PCT/JP2016/004289
§ 371 (c)(1),
(2) Date: Mar. 19, 2019

(87) PCT Pub. No.: WO2018/055654
PCT Pub. Date: Mar. 29, 2018

(65) Prior Publication Data
US 2021/0281577 A1 Sep. 9, 2021

(51) Int. Cl.
*H04L 29/06* (2006.01)
*G06F 21/53* (2013.01)
*H04L 9/08* (2006.01)

(52) U.S. Cl.
CPC .......... *H04L 63/123* (2013.01); *G06F 21/53* (2013.01); *H04L 9/085* (2013.01); *H04L 9/0861* (2013.01); *H04L 63/0435* (2013.01); *H04L 63/1441* (2013.01); *H04L 63/20* (2013.01); *G06F 2221/033* (2013.01)

(58) Field of Classification Search
CPC ... H04L 63/123; H04L 63/20; H04L 63/1441; H04L 9/085; H04L 9/0861; H04L 63/0435; G06F 21/53; G06F 2221/033
See application file for complete search history.

(56) References Cited

U.S. PATENT DOCUMENTS

| | | | |
|---|---|---|---|
| 8,885,647 B2 | 11/2014 | Lim et al. | |
| 9,215,237 B2* | 12/2015 | Sonoda | H04L 63/105 |
| 9,467,296 B2 | 10/2016 | Smith et al. | |
| 10,523,426 B2* | 12/2019 | Jain | H04L 12/4641 |
| 10,567,347 B2* | 2/2020 | Sawant | H04L 63/061 |
| 2007/0060166 A1* | 3/2007 | Kitamura | H04L 43/045 |
| | | | 455/450 |

(Continued)

FOREIGN PATENT DOCUMENTS

| | | |
|---|---|---|
| WO | 2011/013805 A1 | 2/2011 |
| WO | 2015/120783 A1 | 8/2015 |
| WO | 2016/000160 A1 | 1/2016 |

OTHER PUBLICATIONS

Japanese Office Action for JP Application No. 2019-515560 dated Mar. 24, 2020 with English Translation.

(Continued)

*Primary Examiner* — Mahfuzur Rahman

(57) ABSTRACT

A monitoring unit verifies authentication information of a packet received and a rule verification unit verifies authentication information of a rule that matches the packet. The monitoring unit generates authentication information for a packet to be forwarded according to the rule having authentication information verified.

17 Claims, 19 Drawing Sheets

(56) References Cited

U.S. PATENT DOCUMENTS

| | | | | |
|---|---|---|---|---|
| 2008/0244739 | A1* | 10/2008 | Liu | H04L 63/1458 |
| | | | | 726/22 |
| 2012/0158938 | A1* | 6/2012 | Shimonishi | H04L 41/0233 |
| | | | | 709/223 |
| 2013/0156035 | A1 | 6/2013 | Lim et al. | |
| 2015/0188943 | A1* | 7/2015 | Williams | H04L 63/0471 |
| | | | | 713/151 |
| 2016/0065376 | A1 | 3/2016 | Smith et al. | |
| 2017/0034129 | A1* | 2/2017 | Sawant | H04L 63/061 |
| 2017/0324781 | A1 | 11/2017 | Hu et al. | |
| 2018/0375646 | A1* | 12/2018 | Jain | H04L 12/4633 |

OTHER PUBLICATIONS

"Software-Defined Networking", ONF White Paper, Software-Defined Networking: The New Norm for Networks, Apr. 13, 2012, 12 pages total.

"OpenFlow Switch Specification", *Version 1.5.0 ( Protocol version 0x06 )*, ONF TS-020, Open Networking Foundation, Dec. 19, 2014, 277 pages total.

Xin Zhang et al., "Network Fault Localization with Small TCB", ICNP 2011, 12 pages total.

Takayuki Sasaki et al., "SDNsec: Forwarding Accountability for the SDN Data Plane", ICCCN 2016, 10 pages total.

Written Opinion dated Dec. 22, 2016 issued by the International Searching Authority in PCT/JP2016/004289.

International Search Report dated Dec. 22, 2016 issued by the International Searching Authority in PCT/JP2016/004289.

\* cited by examiner

[Fig. 1]
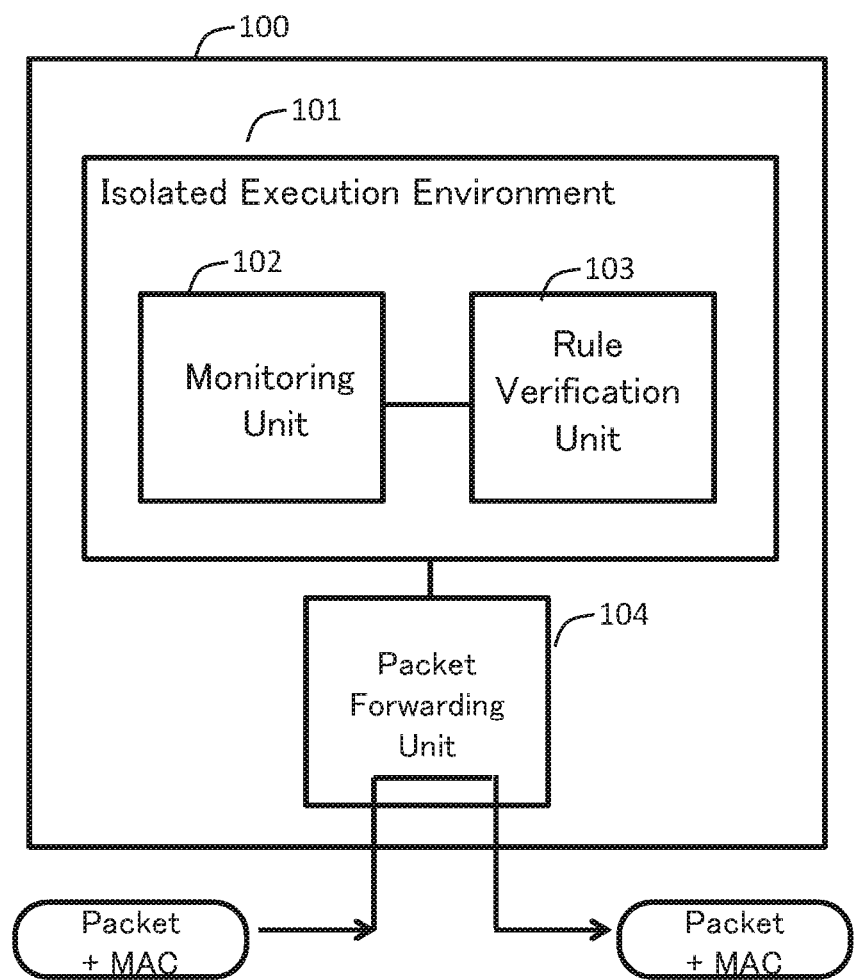

[Fig. 2]
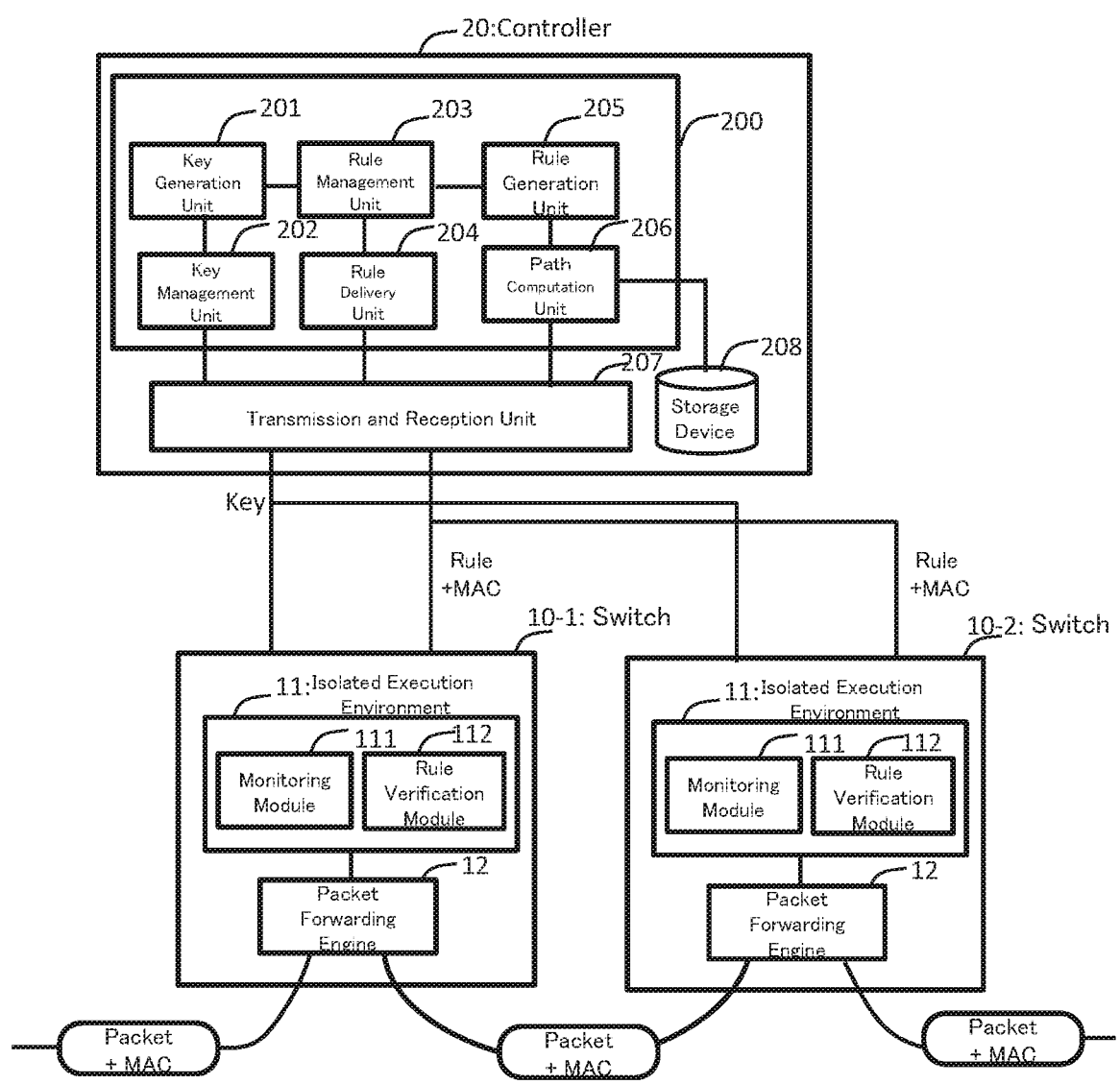

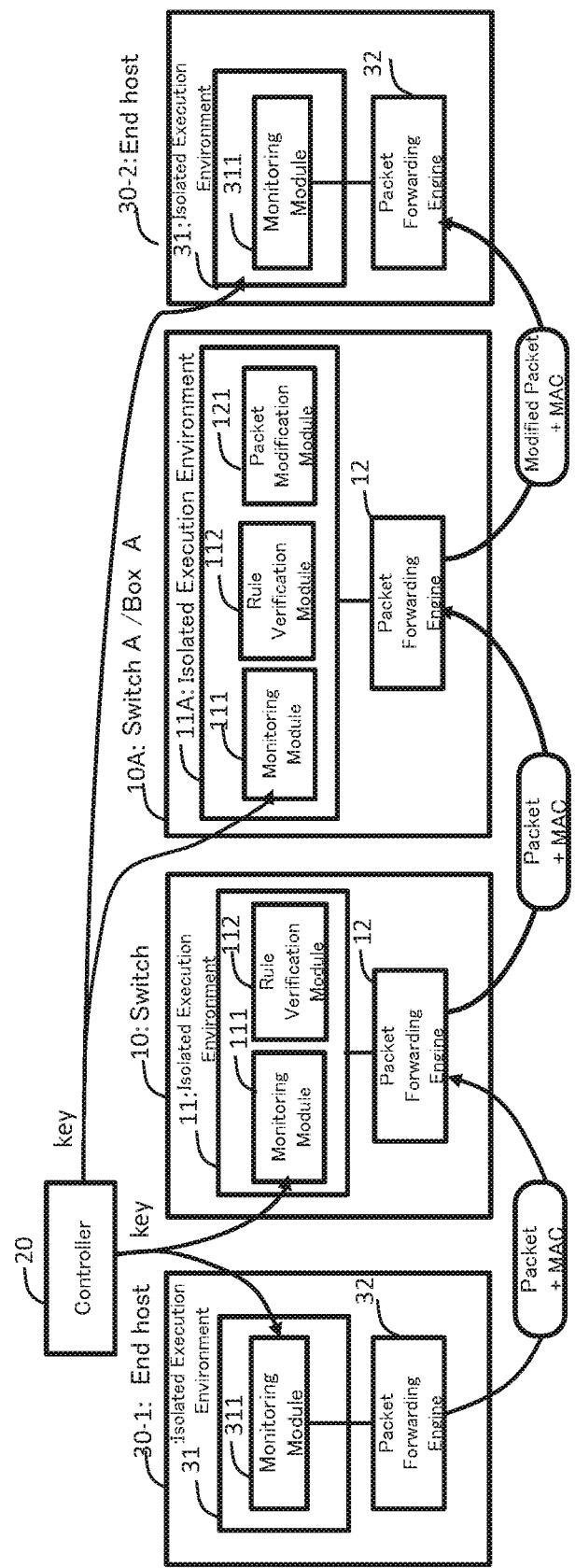
[Fig. 3]

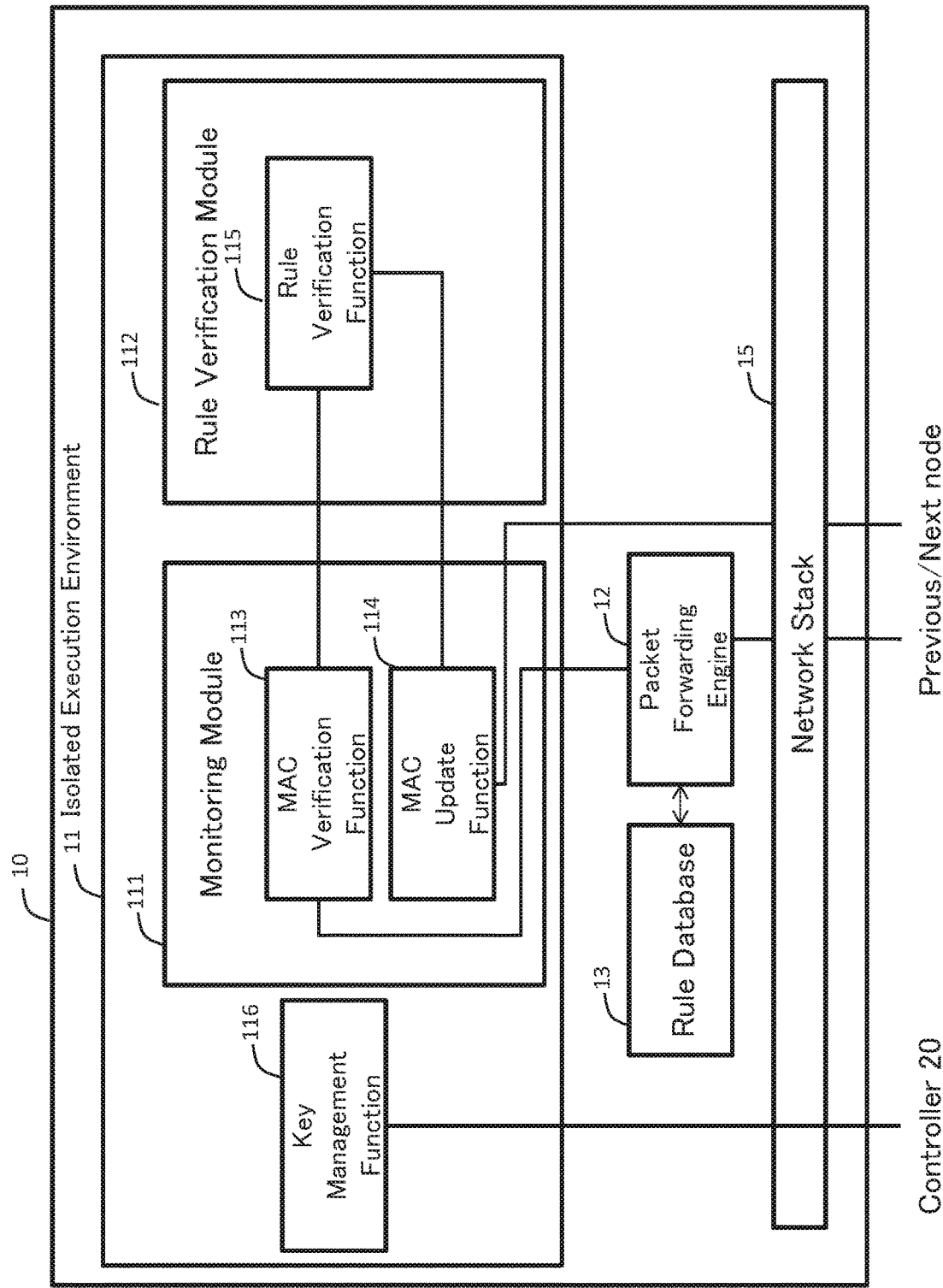
[Fig. 4]

[Fig. 5]
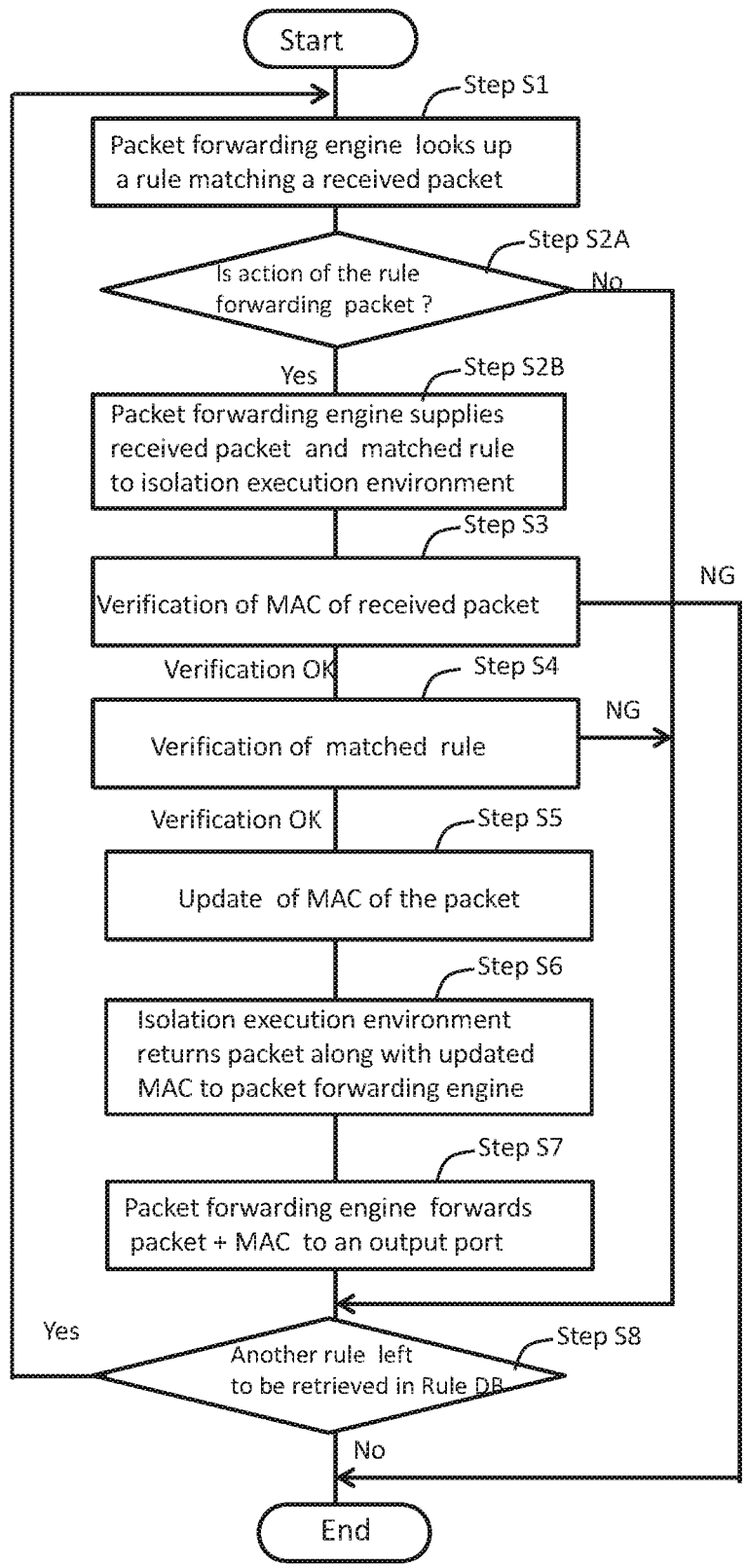

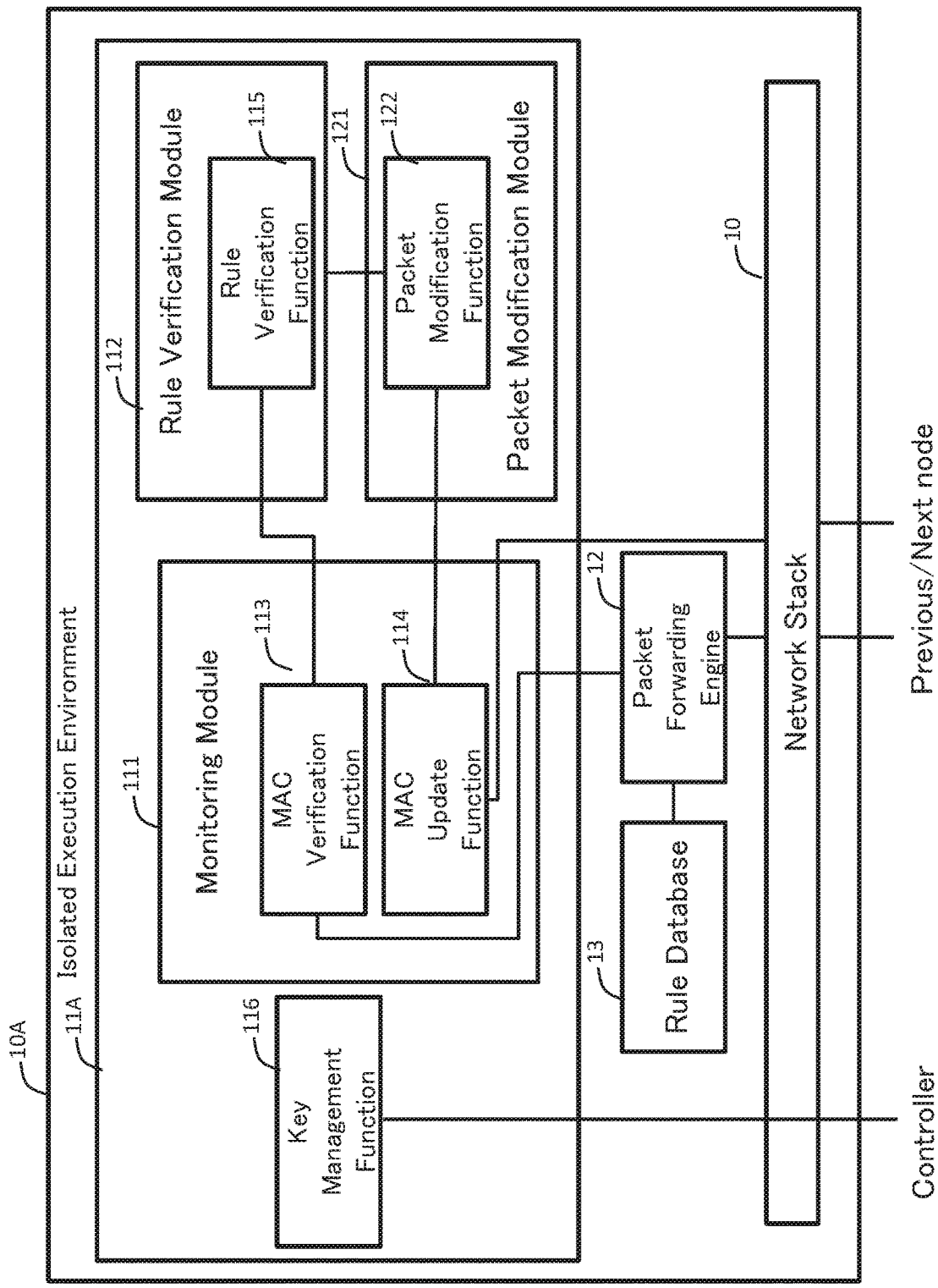
[Fig. 6]

[Fig. 7]
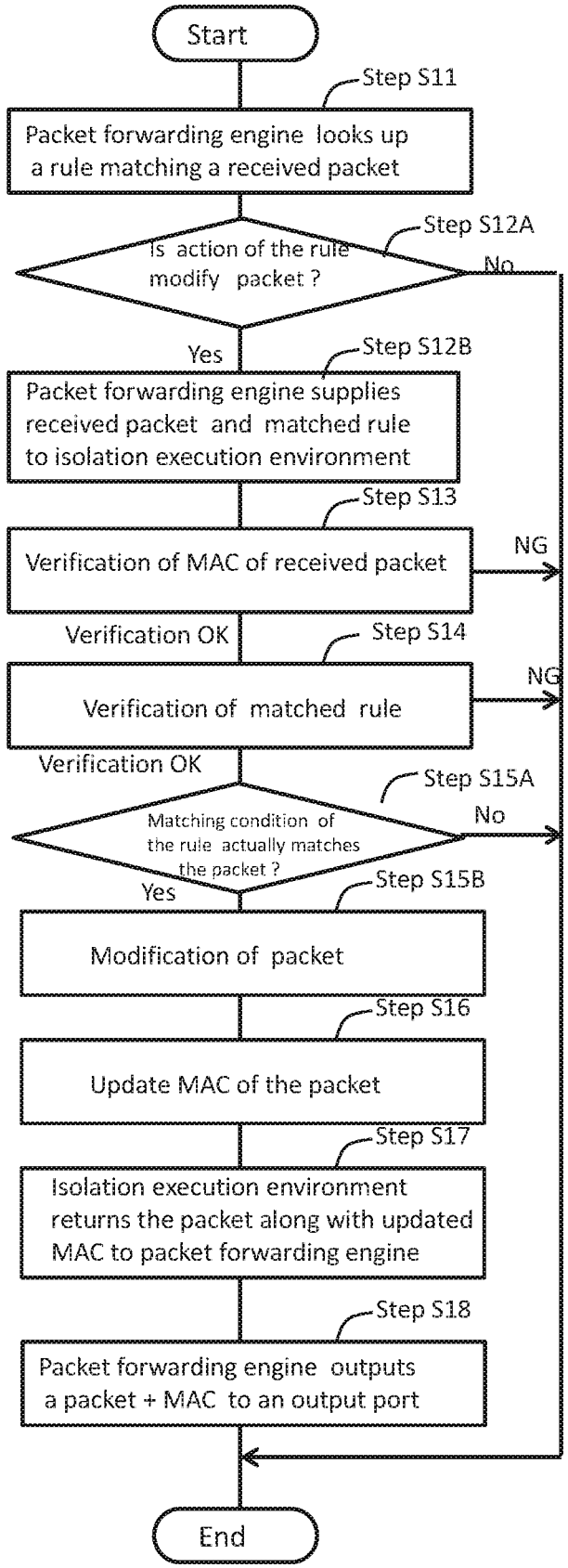

[Fig. 8]
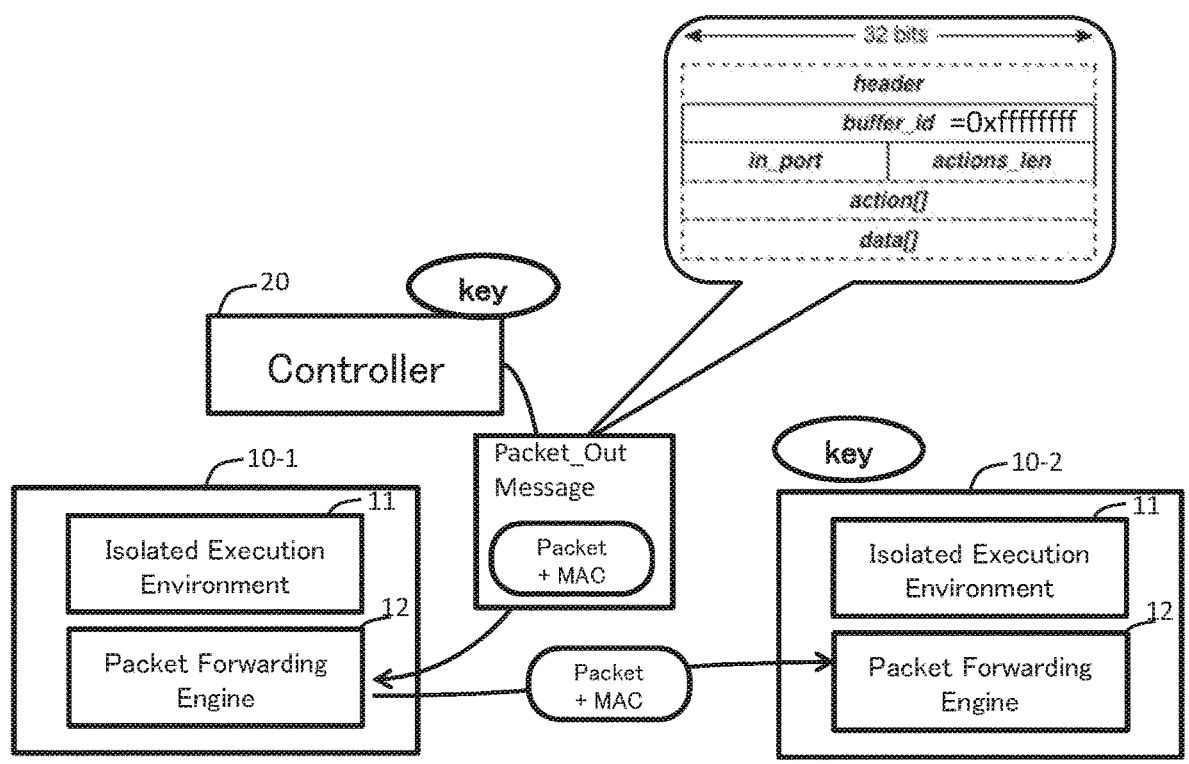

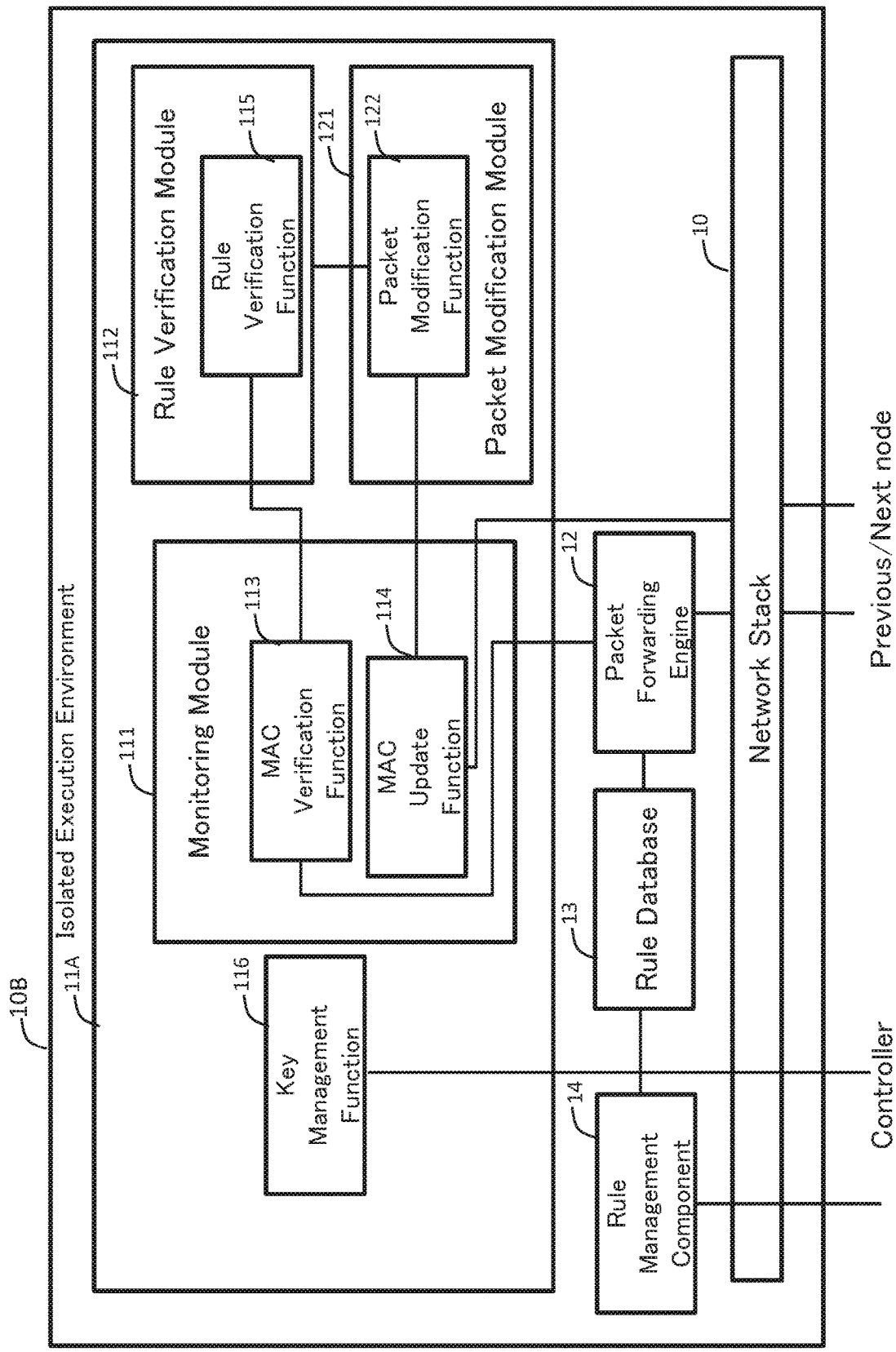
[Fig. 9]

[Fig. 10]
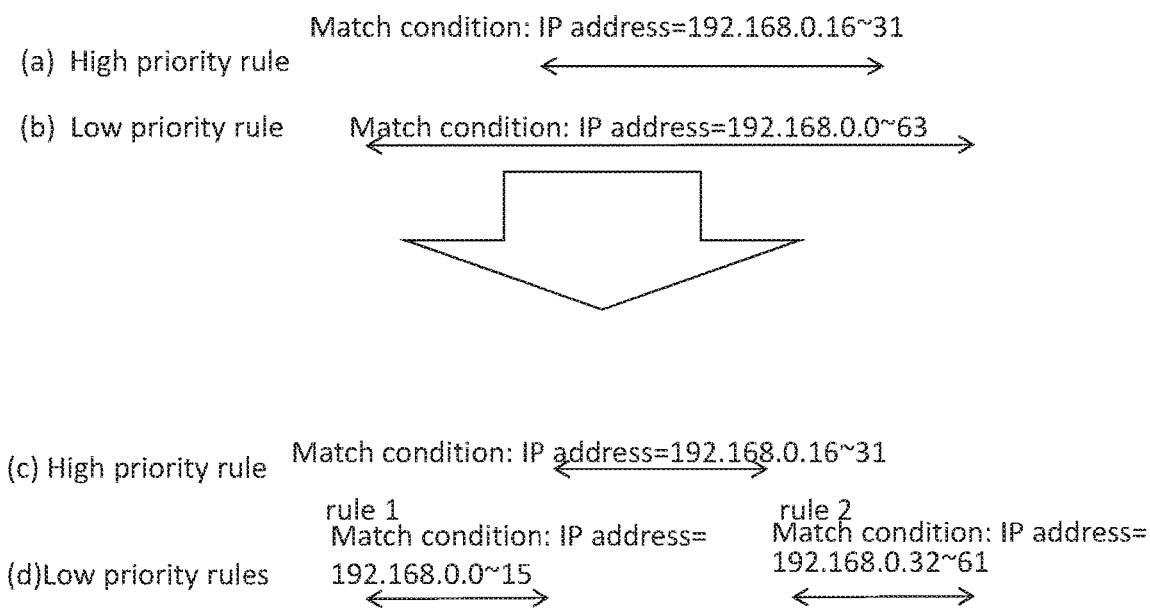

[Fig. 11]
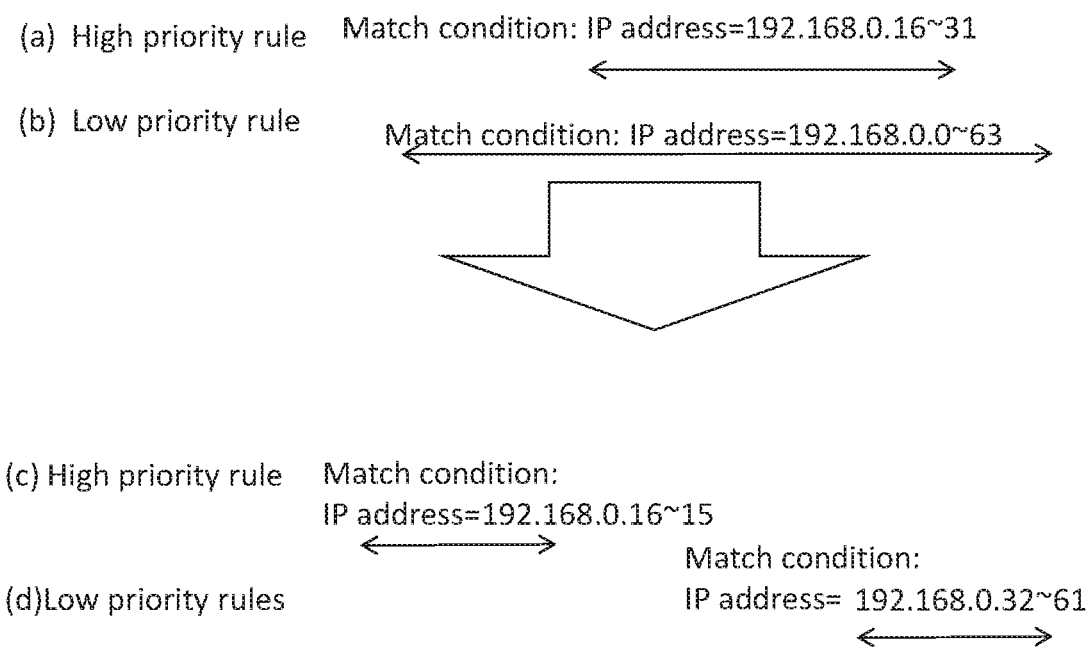

[Fig. 12]
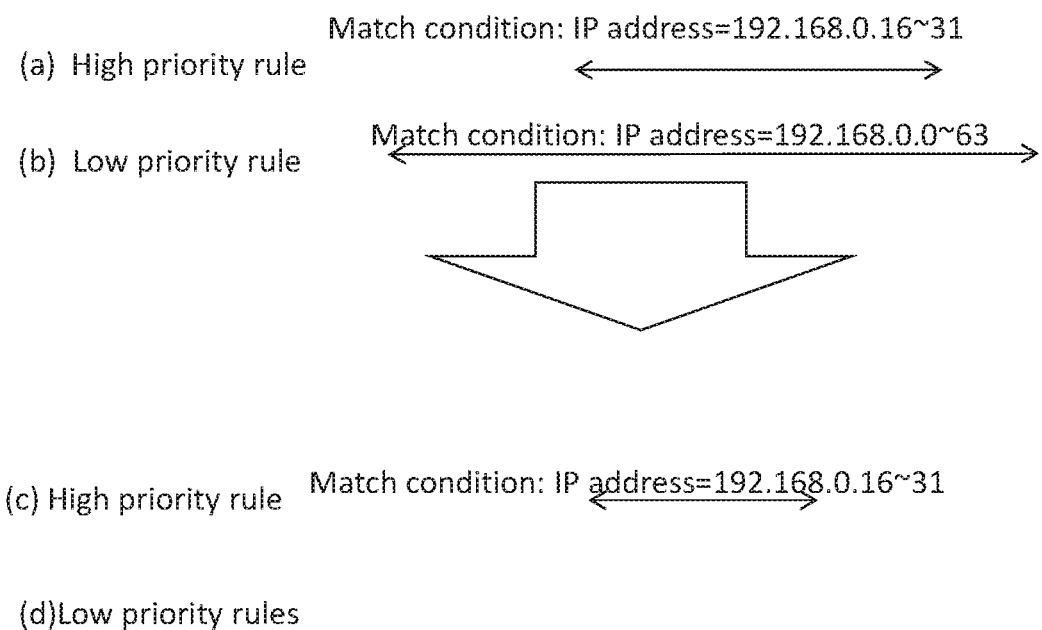

[Fig. 13]
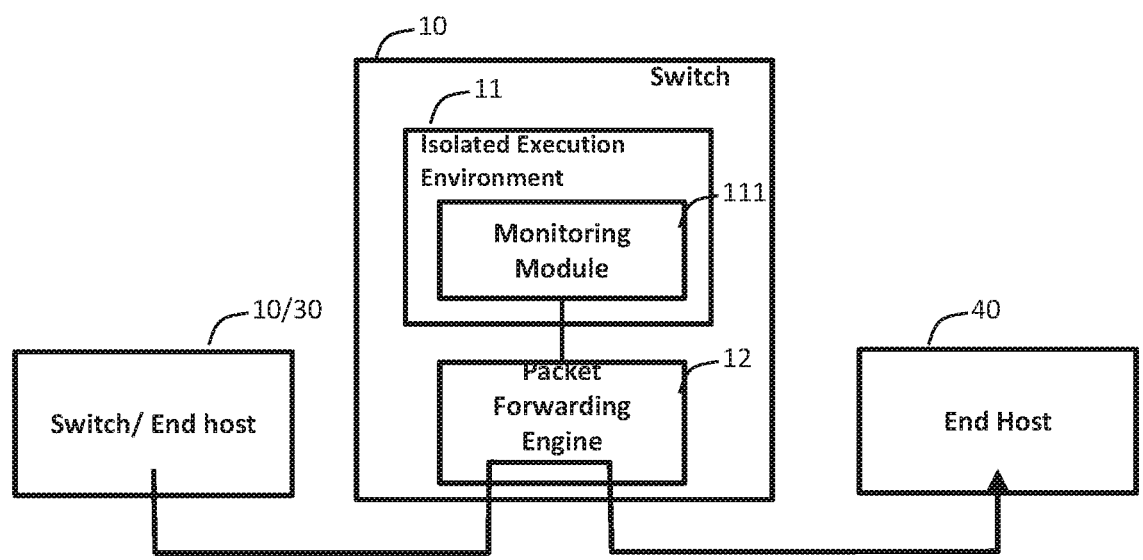

[Fig. 14]
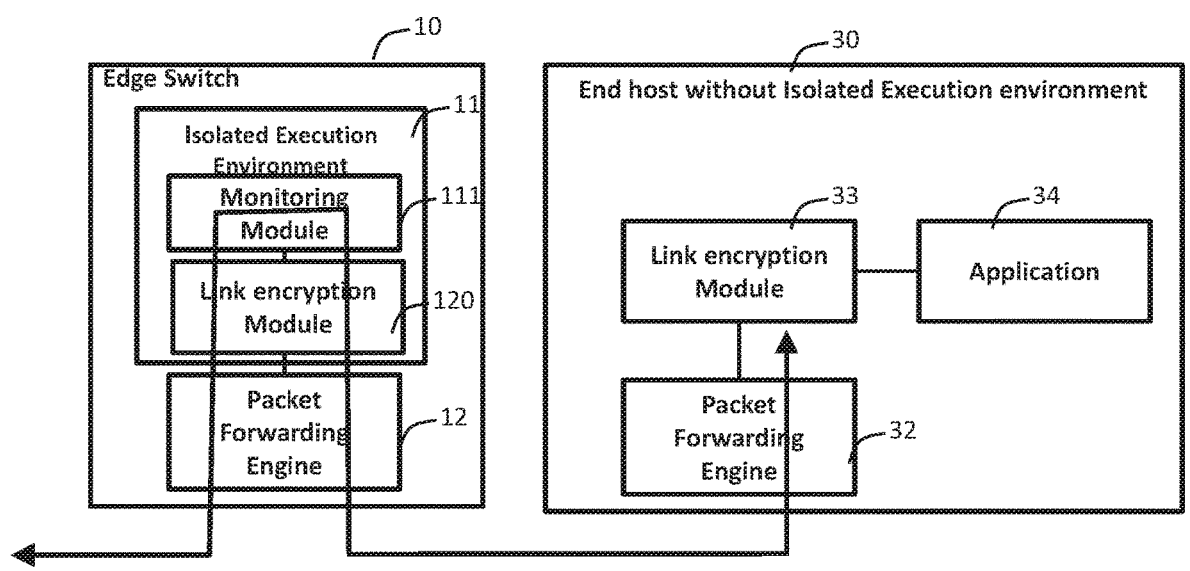

[Fig. 15]
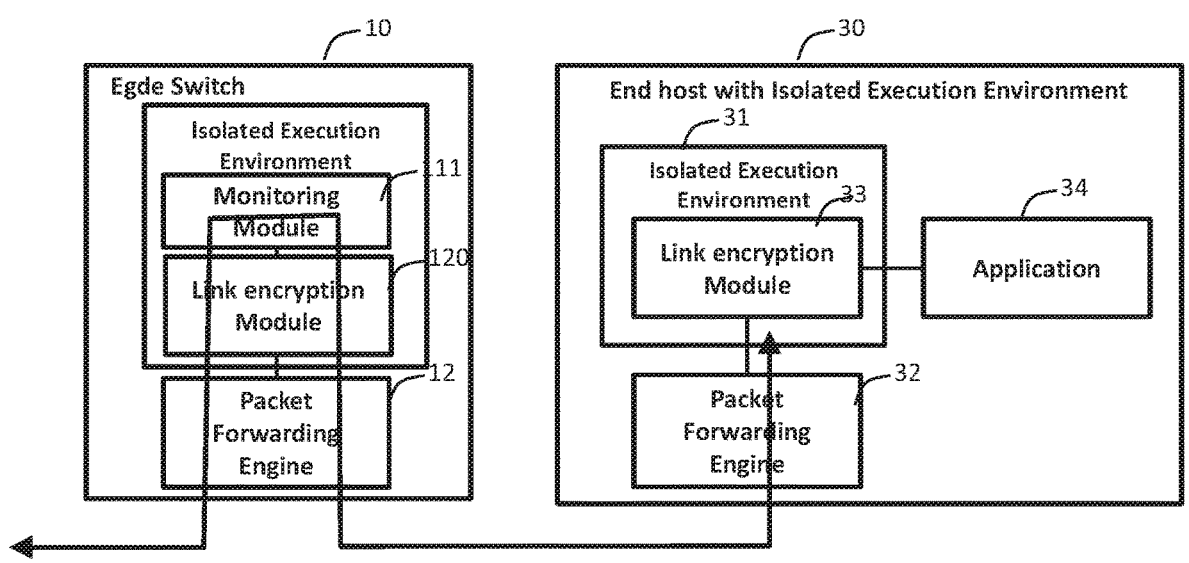

[Fig. 16]
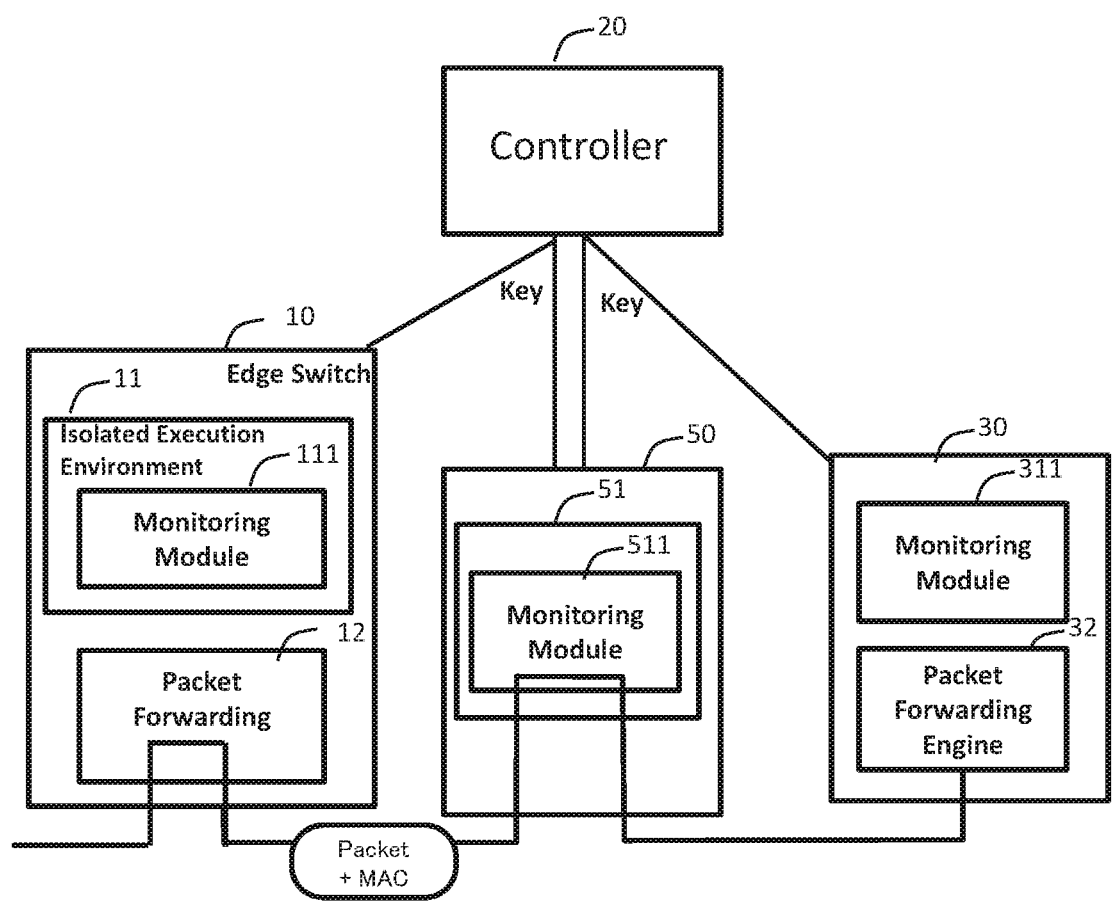

[Fig. 17]
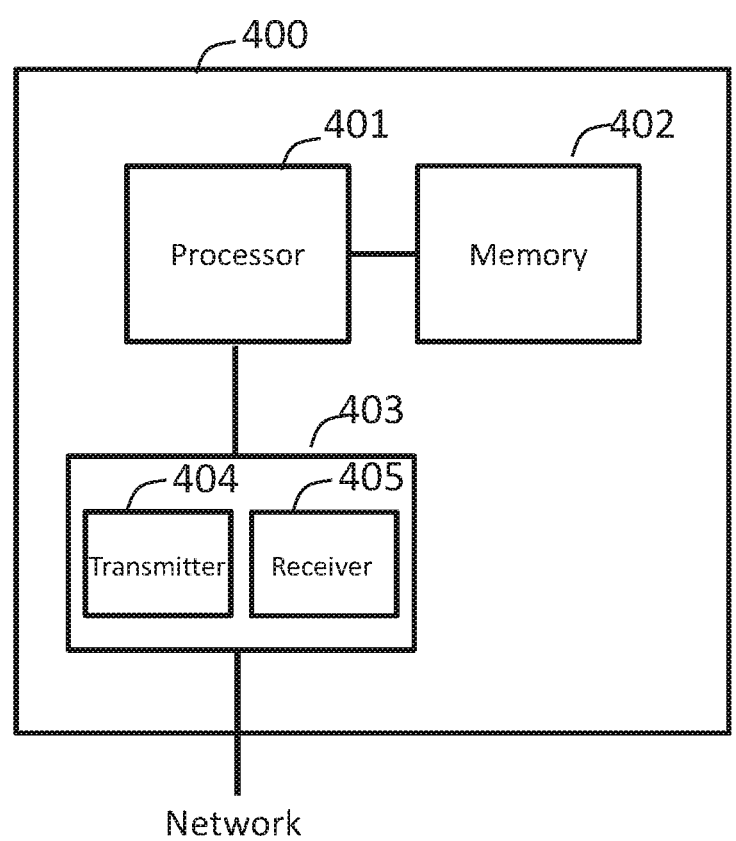

[Fig. 18]
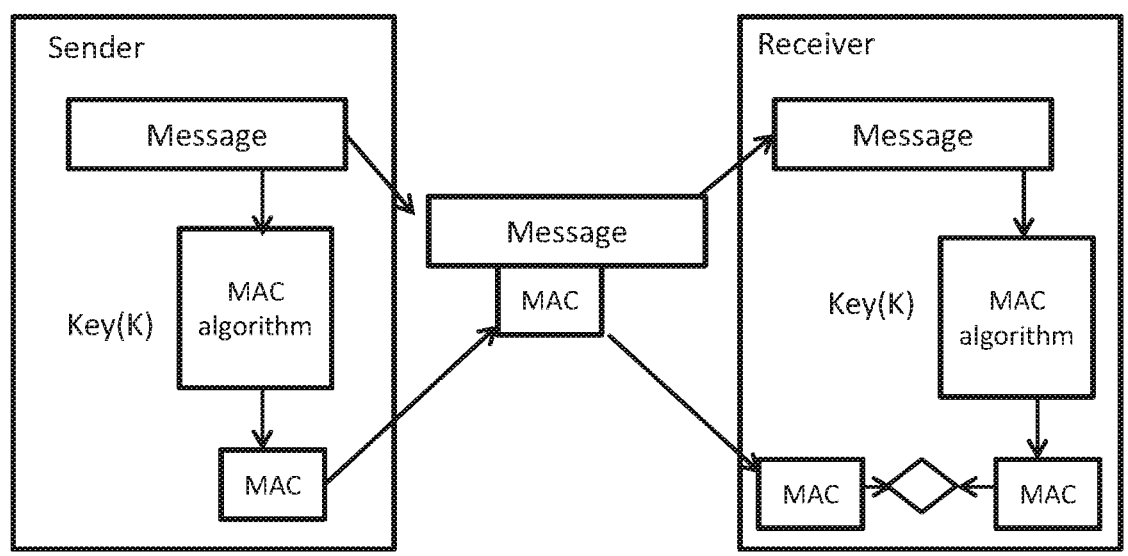
Key(K): Symmetric Key

[Fig. 19]
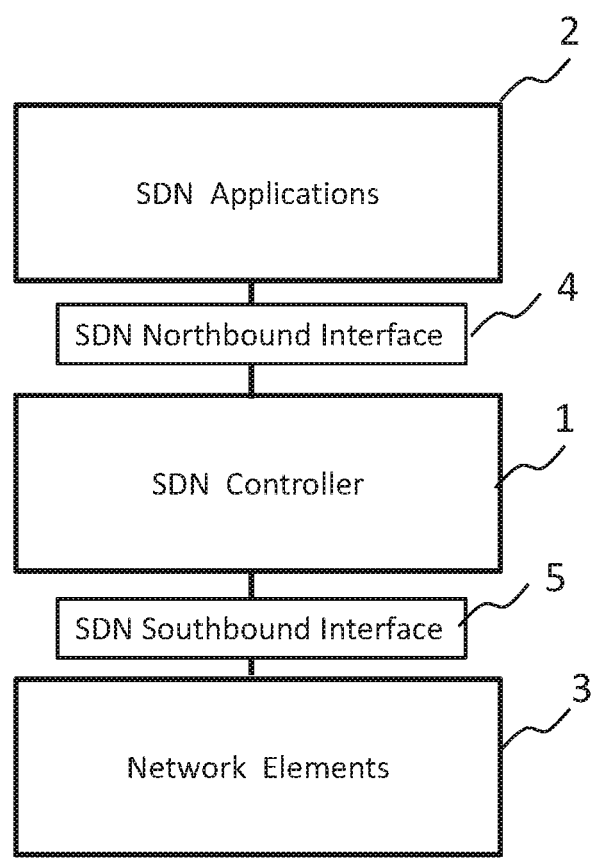

COMMUNICATION APPARATUS, SYSTEM, METHOD, AND NON-TRANSITORY MEDIUM

This application is a National Stage Entry of PCT/JP2016/004289 filed on Sep. 20, 2016, the contents of all of which are incorporated herein by reference, in their entirety.

TECHNICAL FIELD

The present invention relates to a communication apparatus, system, method and non-transitory medium.

BACKGROUND

In an SDN (Software Defined Network) architecture, control and data planes are decoupled, network intelligence and state are logically centralized, and the underlying network infrastructure is abstracted from the applications, as a result of which unprecedented programmability, automation, and network control are provided to enable a carrier, for example, to build highly scalable, flexible networks that readily adapt to changing environments or needs (NPL (Non Patent Literature) 1).

As illustrated in FIG. 19, the SDN architecture typically includes an SDN controller 1, SDN applications 2 connected to the SDN controller 1 via an SDN Northbound interface 4 and network elements 3 connected to the SDN controller 1 via SDN control data plane interface (SDN Southbound interface 5). The SDN controller 1 receives instructions or requirements from the SDN applications 2 (Northbound applications) via the SDN Northbound interface 4 and relays the received instructions or requirements via the SDN Southbound interface 5 to the network elements 3.

Though not limited thereto, network policy may be used, for example, to dynamically create policy-based virtual networks to meet a range of requirements. The SDN controller 1 may perform path-computation based on a network topology. The SDN controller 1 may well perform the path-computation based on the network policy in addition to the network topology. Network elements 3 may include one or more switches that perform functions of forwarding and processing of packet data. There may be a network system wherein network elements 3 also include one or more of middle boxes. A middle box may include at least one of a firewall that filters a packet based upon a security rule, NAT (network address translation) that replaces source and/or destination IP (Internet Protocol) addresses of a packet that traverses the NAT, IDS (Intrusion Detection System), a load balancer and so forth. Data plane of SDN may include edge and core switches. Edge switches operate at an edge of a network and serve as an entry and exit points to the network, while core switches operate in a middle of the network and each of the core switches forwards a packet based on a rule that matches the packet. The following outlines OpenFlow, as an example of SDN. It is noted that OpenFlow is not the only protocol available in SDN.

A switch (also referred to as OpenFlow Switch: OFS) includes a flow table including one or more flow entries (rules) stored in a flow table. Each flow entry includes a match field to be matched with header field information of a received packet, a counter field including statistics information such as the number of received packets and the number of received bytes, and an action field with zero or more actions that dictate how the switch handles a received packet whose header field information matches the match field. Upon reception of a packet, the switch retrieves the flow table thereof using header field information of the received packet. In the case of miss-hit (non-match), the switch sends the received packet (first packet) using a Packet-In message to a controller (SDN controller) over a secure channel.

On reception of the Packet-In message, based upon information on a source and a destination of the first packet, the controller (corresponding to the SDN controller in FIG. 19) computes a path for the packet by referring network topology information. Based upon the path, the controller generates a flow entry for each of switches disposed on the path and sets the generated flow entry for each of the switches disposed on the path by sending a Flow-Modify (Flow-Mod) message to the switch.

Flow-Modify message includes, for example, a flow_mod_add that adds a flow entry in a flow table of the switch, a flow_mod_delete that deletes a flow entry in a flow table of the switch, and a flow_mod_modify that modifies a flow entry in a flow table of the switch. Flow_mod_add specifies a matching condition and action of a flow entry to be added. In the flow_mod_add command, information items may be optionally specified, such as a priority to specify a priority of the flow entry to be added, a hard time out to specify a life cycle of the flow entry, or a check overlap flag=true to inhibit adding of a new flow entry in the flow table when overlap of flow entries with the same priority is found. Each of the switches on the path, on reception of one or more packets that follow the first packet and each have a header matching a match field of the flow entry set by the controller, forwards the one or more packets to a next node, for example, as prescribed in the action field of the flow entry. Regarding details of OpenFlow, reference may be made to NPL 2 listed in the below.

SDN is rife with vulnerabilities at a data plane. More specifically, software-programmable network switches for packet forwarding exhibit software vulnerabilities and are susceptible to attacks (data-plane attacks). Malicious packets may try to change operation of the network switches. A compromised switch can exfiltrate security sensitive data. The compromised switch can redirect traffic to a host controlled by an attacker. Existing firewall and IDS (Intrusion Detection System)/IPS(Intrusion prevention system) do not work because IDS/IPS cannot detect redirected traffic.

IDS/IPS basically checks traffic on the basis of pre-defined attack signatures. Attack signatures are rules or patterns that identify attacks or classes of attacks on a web application and its components.

NPL 1 discloses a fault localization technique, wherein each switch embeds Message Authentication Code (MAC) computed over a packet and a next switch verifies the MAC so that the next switch can detect malicious switch behaviors such as packet modification, redirect, and dropping.

MAC is a kind of an encrypted checksum generated for a message and sent along with a message to ensure authenticity of message. MAC algorithm inputs a secret key and a message to be authenticated to compress an arbitrary length of the input message into a MAC of a fixed length using the secret key. As illustrated in FIG. 18, a sender of a message executes MAC algorithm to the message using a secrete key K (cryptographically symmetric key) to generate a MAC and sends the message along with the MAC to a receiver. Upon reception of the message and the MAC, the receiver supplies the message and the secrete key K (cryptographically symmetric key) shared between the sender and the receiver to the MAC algorithm to compute a MAC. The receiver checks equality of the computed MAC and the MAC received from the sender. If the computed MAC and the MAC received from the sender match, the receiver may accept the message received because the receiver may safely assume that the message has not been compromised and the message has not been altered in an unauthorized manner or tampered with. If the MAC sent thereto from the sender and the MAC computed do not match, the receiver may safely assume the message is not genuine.

NPL 2 discloses SDNsec whose data plane consists of edge and core switches. Edge switches operate at edge of network. Core switches operates in the middle of the network and forward packets based on forwarding information in the packets. Edge switches includes an ingress switch that receives packets from source hosts and embeds forward information in the packet (SDN sec packet header). Edge switches includes en egress switch that receives packets from a core switch and forwards the packet to a destination. A forwarding entry of a packet includes a MAC. Each switch on the path checks the MAC to detect modification of the path information. Each switch also adds a cryptographic marking to a packet and an egress switch sends the marking to a controller so that the controller can verify the path that a packet actually went through. A controller generates and shares a secrete key with every switch in the data plane.

PTL (Patent Literature) 1 discloses a local computing device performing attestation of a remote computing device based on communication with a corresponding remote trusted message module established in a trusted execution environment of the remote computing device. The local computing device exchanges with the remote trusted module, cryptographic keys, in response to successful attestation of the remote computing device. To securely transmit an outgoing message to the remote computing device, the local trusted message module encrypts the outgoing message and cryptographically signs the outgoing message transmitted to remote computing devices. To securely receive an incoming message from the remote trusted message module of the remote computing device, the local trusted message module decrypts the incoming message and verifies cryptographic signature of the incoming message, based on exchanged cryptographic keys.

PTL 1: US 2016/0065376 A1
NPL 1: Software-Defined Networking: The New Norm for Networks, ONF White Paper Apr. 13, 2012 Internet URL:https://www.opennetworking.org/images/stories/downloads/sdn-resources/white-papers/wp-sdn-newnorm.pdf
NPL 2: OpenFlow Switch Specification Version 1.5.0 (Protocol version 0x06) Dec. 19, 2014, Internet URL:https://www.opennetworking.org/images/stories/downloads/sdn-resources/onf-specifications/openflow/openflow-switch-v1.5.0.noipr.pdf
NPL 3: Network Fault Localization with Small TCB, Xin Zhang, Zongwei Zhou, Geoff Hasker, Adrian Perrig, Virgil Gligor, ICNP 2011, <Internet URL: http://www.netsec.ethz.ch/publications/papers/TrueNet.pdf>
NPL 4: SDNsec: Forwarding Accountability for the SDN Data Plane, Takayuki Sasaki, Christos Pappas, Taeho Lee, Torsten Hoefler, Adrian Perrig, ICCCN 2016, <Internet URL:http://www.netsec.ethz.ch/publications/papers/sdnsec2016.pdf>

SUMMARY

The disclosures of PTL 1 and NPLs 1-4 given above are hereby incorporated in their entirety by reference into this specification.

The following analysis is made by the inventors of the present invention.

Once a switch compromised the switch can exfiltrate security sensitive data. The compromised switch can redirect traffic to a host controlled by an attacker.

The related technologies do not consider a middle box including a firewall that filters unwanted or malicious traffic, and a network address translators that modifies packets' source and destination addresses, and a SDN switch that may modify a packet. Packet modification causes false positives because the MAC becomes invalid.

As a related technology of a trust computing technology, a secure network architecture using Intel (Registered trade mark) SGX (Software Guard Extensions) is a research topic. Intel SGX is a set of new instructions from Intel that allows user-level code to allocate private regions of memory, called enclaves, that unlike normal process memory is also protected from processes running at higher privilege levels.

Accordingly, it is an object of the invention to provide a communication apparatus, system, method and non-transitory medium capable to improve resistivity against data-plane attack to enhance network security.

According to an aspect of the disclosure, there is provided a communication apparatus comprising: a processor; and a memory storing program instructions executable by the processor; wherein the processor is configured to perform a monitoring process configured to verify authentication information of a packet received; and a rule verification process configured to verify authentication information of a rule that matches the packet, wherein the monitoring process generates authentication information for a packet to be forwarded according to the rule having authentication information thereof verified.

According to another aspect of the disclosure, there is provided a communication system comprising: a controller; and a plurality of network elements, wherein the network element includes: a monitoring unit configured to verify authentication information of a packet received; and a rule verification unit configured to verify authentication information of a rule that matches the packet, wherein the monitoring unit generates authentication information for a packet to be forwarded according to the rule having authentication information thereof verified.

According to still another aspect of the disclosure, there is provided a controller that controls a plurality of network elements, comprising: a processor; and a memory storing program instructions executable by the processor; wherein the processor is configured to perform a key generation process configured to generate a secret key shared by a pair of network elements forming a sender and a receiver of a packet and used for generation and verification of authentication information of the packet by the sender and the receiver, respectively, the key generation process generating secret keys shared by the controller and the network element forming a sender and a receiver of a rule and used for generation and verification of authentication information of the rule by the controller and the network element, respectively;

a rule generation process configured to generate a rule for the network element;

a rule management process configured to generate authentication information for the generated rule using the secret key shared by the controller and the network element; and a rule delivery process that sends the rule along with the authentication information to the network element, the network element verifying authentication information of a packet received and verifying authentication information of a rule that matches the packet, the network element generating authentication information for a packet to be forwarded according to the rule having authentication information verified.

According to a further aspect of the disclosure, there is provided a communication method for a network element, comprising:

performing verification process to verify authentication information of a packet received;

performing verification process to verify authentication information of a rule that matches the packet;

performing generation process to generate authentication information of the packet having authentication information thereof verified; and forwarding the packet along with the generated authentication information of the packet based on the rule having authentication information thereof verified. In one embodiment, the method may comprise: receiving a packet and looking up rules to find a rule that matches the packet and providing the packet received and the rule that matches the packet to verification process of the packet and rule;

when the packet and the rule both pass the verification process thereof, generating authentication information of the packet; and forwarding to a next node the packet along with the authentication information, according to the rule.

According to yet another aspect of the disclosure, there is provided a program causing a computer to execute processing comprising:

verifying authentication information of a packet received;

verifying authentication information of a rule that matches the packet; and generating authentication information for a packet to be forwarded according to the rule having authentication information thereof verified.

According to yet further aspect of the disclosure, there is provided a program causing a computer to execute:

a key generation process to generate a secret key shared by a pair of network elements forming a sender and a receiver of a packet and used for generation and verification of authentication information of the packet by the sender and the receiver, respectively, the key generation process generating secret keys shared by the controller and the network element forming a sender and a receiver of a rule and used for generation and verification of authentication information of the rule by the controller the network element, respectively;

a rule generation process to generate a rule for the network element;

a rule management process to generate authentication information for the generated rule using the secret key shared by the controller and the network element; and a rule delivery process to send the rule along with the authentication information to the network element, the network element verifying authentication information of a packet received and verifying authentication information of a rule that matches the packet, the network element generating authentication information for the packet to be forwarded according to the rule having authentication information thereof verified.

According to another aspect of the disclosure, there is provided a computer readable recording medium or non-transitory recording medium such as a semiconductor storage such as a read only memory (ROM), or a random access memory (RAM), or electrically and erasable programmable read only memory (EEPROM), a hard disk drive (HDD), a compact disc (CD) or a digital versatile disc (DVD) in which the program according to the above aspect of the disclosure is stored.

According to the disclosure, it is possible to improve a resistivity against data-plane attack to enhance a network security.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 1 is a diagram illustrating an arrangement of a communication apparatus in an aspect of the disclosure.

FIG. 2 is a diagram illustrating an arrangement of a controller in one aspect of the disclosure.

FIG. 3 is a diagram schematically illustrating a communication system of a first exemplary embodiment of the disclosure.

FIG. 4 is a diagram schematically illustrating an arrangement of a switch in the first exemplary embodiment of the disclosure.

FIG. 5 is a diagram schematically illustrating an operation of a switch in the first exemplary embodiment of the disclosure.

FIG. 6 is a diagram schematically illustrating an arrangement of a switch or BOX in the first exemplary embodiment of the disclosure.

FIG. 7 is a diagram schematically illustrating an operation of the switch or BOX in the first embodiment of the disclosure.

FIG. 8 is a diagram schematically illustrating an example of packet injection in the first embodiment of the disclosure.

FIG. 9 is a diagram illustrating a switch in a second exemplary embodiment of the disclosure.

FIG. 10 is a diagram illustrating an example of solution of overlapping in rule.

FIG. 11 is a diagram illustrating another example of solution of overlapping in rule.

FIG. 12 is a diagram illustrating a further example of solution of overlapping in rule.

FIG. 13 is a diagram illustrating an example of detouring.

FIG. 14 is a diagram illustrating an example of solution to detouring.

FIG. 15 is a diagram illustrating an example of solution to detouring.

FIG. 16 is a diagram illustrating an example of solution to detouring.

FIG. 17 is a diagram illustrating a configuration in a further exemplary embodiment of the disclosure.

FIG. 18 is a diagram illustrating MAC generation in a sender and verification in a receiver.

FIG. 19 is a diagram illustrating an SDN architecture.

PREFERRED MODES

The following describes exemplary embodiments of the disclosure.

<Communication Apparatus>

FIG. 1 illustrates a communication apparatus according to one aspect of the disclosure. Referring to FIG. 1, a communication apparatus 100 includes an isolated execution environment 101 and a packet forwarding unit 104. The communication apparatus 100 includes a monitoring unit 102 deployed in the isolated execution environment 101 and a rule verification unit 103 deployed in the isolated execution environment 101.

A packet forwarding unit 104, for example, performs layer 2 and layer 3 packet switching, route lookups, and packet forwarding, though not limited thereto. The packet forwarding unit 104 forwards a packet between input and output interfaces (ports) thereof.

The isolated execution environment 101 is a programming environment that may be created by a specific instruction(s), a command(s), or, a system call(s) executed on a processor (401 in FIG. 17), in a region of a physical address space in a memory (402 in FIG. 17) that is isolated and protected from a memory region assigned to other processes, OS (Operating System)/Hypervisor, device drivers and so forth. Memory partitioning techniques, for example, may be used to implement the isolated execution environment 101 for protection and isolation of processes in temporal and spatial domains. Low-criticality processes cannot compromise other processes with a higher level of criticality.

Memory Management Unit (MMU) implemented in hardware that translates a virtual page address to a physical page address may be used for the memory partitioning (isolation) to prevent a process running in a partition from reading or writing into address space allocated to other partitions. MMU may perform address translation from a virtual (logical) address of each process to a physical address by using a relocation register to which a base address of a memory space for the process is set. The base address in the relocation register and the logical address are added to generate the physical address. MMU also may check that the generated physical address is in a range defined by the base address and the limit address of the process. This functions as memory protection mechanism. When MMU detects an occurrence of memory access violation, such as accessing a memory space from a process that has no access right, or accessing outside the range defined by the base address and the limit allotted to the process, a fault process may be notified of addressing error by trap, or may be aborted with notification of addressing error.

The isolated execution environment 101 may be implemented as such an environment complying with a trusted execution environment. Alternatively, more sophisticated approach to prevent snooping attack, such as Intel (Registered Trade Mark) SGX (Software Guard Extensions) or the like may be adopted as the isolated execution environment 101, though not limited thereto.

The monitoring unit 102 deployed in the isolated execution environment 101 verifies a MAC (Message Authentication Code) of a packet received from a preceding communication apparatus. The monitoring unit 102 executes a MAC algorithm for a message of a packet received using a key (cryptographically symmetric key) shared between the two parties, that is, the communication apparatus 10 and a sender of the packet, and checks whether if the MAC computed by the communication apparatus 10 using the MAC algorithm is identical with the received MAC. If the computed MAC is identical with the MAC received from the sender, the monitoring unit 102 may safely assume that the packet has not been altered.

The monitoring unit 102 re-computes (updates) a MAC of the packet to be forwarded to a next node according to the rule by executing a MAC algorism using a secret key (cryptographically symmetric key) shared between the communication apparatus 10 and the next node to which the packet is to be forwarded according to a rule that matches the packet.

MAC that has been computed by the MAC algorithm using a secrete key for a packet may be embedded in a packet. That is, a packet may be configured to have an information field, for example, in a header of the packet, to accommodate a MAC therein. The MAC for the packet may be computed over header fields and a payload of the packet. Alternatively, the MAC may be computed over only the header fields. In this case, integrity of the payload is not ensured, but it is lightweight compared to computation over an entire packet.

The rule verification unit 103 deployed in the isolated execution environment 101 verifies a MAC of a rule. The communication apparatus 10 receives the rule from a controller (not shown).

A rule has an action field to define one or more actions to be applied to a packet that is matched to a predetermined matching condition defined in a match field of the rule. The rule may be a flow entry in OpenFlow network that includes a match field to be matched with header field information of a received packet, a counter field including statistics information such as the number of received packets and the number of received bytes, and an action field with zero or more actions that dictate how the switch handles a received packet whose header field information matches the match field.

Upon reception of a packet, the packet forwarding unit 104 looks up rules using header field information of the received packet to find a rule with a match filed (condition) matching the received packet. The packet forwarding unit 104 supplies the received packet and the matched rule to the isolated execution environment 101. The monitoring unit 102 performs verification of a MAC of the received packet as mentioned above.

The rule verification unit 103 computes a MAC of a rule supplied by the packet forwarding unit 104 using a secret key (cryptographically symmetric key) shared between the controller (not shown) and the communication apparatus 100 and checks whether if the computed MAC is identical with the MAC of the rule received from the controller. If the computed MAC is identical with the MAC received from the controller, the rule verification unit 103 assumes that the rule has not been altered.

MAC may be HMAC (Hash-based Message Authentication Code) constructed using a cryptographic hash function. Alternatively, MAC may be constructed using a block cipher algorithm, such as CBC-MAC (cipher block chaining message authentication code).

The communication apparatus 100 may include a network switch, a middle box or the like, though not limited thereto. The communication apparatus 100 can be implemented on a server using NFV (Network Functions Virtualization), for example.

<Controller and Switches>

FIG. 2 is a diagram schematically illustrating an arrangement of a controller 20 and switches 10-1/10-2 according to one aspect of the disclosure. In FIG. 2, the switches 10-1 and 10-2 each correspond to the communication apparatus 100 described with reference to FIG. 1. An isolated execution environment 11, a monitoring module 111, a rule verification module 112, and a packet forwarding engine 12 in the switch 10-1/10-2 correspond respectively to the isolated execution environment 101, the monitoring unit 102, the rule verification unit 103, and the packet forwarding unit 104 in the communication apparatus 100 described with reference to FIG. 1. The switches 10-1 and 10-2 may be implemented as software-programmable network switches. The controller 20 may be implemented as an SDN controller.

Referring to FIG. 2, the controller 20 includes a processor 200, a transmission and reception unit 207, and a storage device 208. The processor 200 includes a key generation unit (process) 201, a key management unit (process) 202, a rule management unit (process) 203, a rule delivery unit (process) 204, a rule generation unit (process) 205, and a path computation unit (process) 206. At least one of the units (processes) 201-206 may well be implemented by one or more software programs running on the processor 200.

The key generation unit 201 generates a secret key (symmetric key) shared between a pair of switches 10-1 and 10-2 and used to generate and verify a MAC of a packet by the pair of switches 10-1 and 10-2.

The key generation unit 201 generates a secret key (symmetric key) that is shared between the controller 20 and each of the switches 10-1 and 10-2 and that is used respectively to generate a MAC of a rule by the controller 20 and to verify a MAC of the rule by each of the switches 10-1 and 10-2. Alternatively, the key generation unit 201 may generate a master key for the switches 10-1 and 10-2. The switches 10-1 and 10-2 may each generate a secret key from the master key distributed from the controller 20.

The key management unit 202 distributes secret keys for generating and verifying a MAC of a packet to a pair of switches 10-1 and 10-2. The key management unit 202 distributes secret keys for verifying a MAC of a rule respectively to the switches 10-1 and 10-2. The key management unit 202 may retain and manage each key generated in association with a node ID (Identity) (switch ID) of each of the switches 10-1 and 10-2 to which the key is distributed in a storage device 208.

The rule generation unit 205 generates a rule, based on a path calculation result by a path computation unit 206. The rule is so configured to cause the switch 10-1/10-2, to which the rule is sent, to forward a received packet to a next node in accordance with the path.

The path computation unit 206 computes a path based on network topology information stored in a storage device 208, when a Packet_In massage is received by the transmission and reception unit 207 from the switch 10-1/10-2.

The rule management unit 203 manages the rule generated by the rule generation unit 205. The rule management unit 203 computes a MAC of the rule using a secrete key shared between the controller 20 and the switch 10-1/10-2. The rule management unit 203 may retain each rule in association with an identity of the switch 10-1/10-2 (node ID), an identity or number of rule (rule ID) and a MAC of the rule in the storage device 208.

The rule delivery unit 204 may send the rule to the switch 10-1/10-2 using a Flow_mod_add message, for example. The rule delivery unit 204 may send a MAC of the rule along with the rule. Or, the rule management unit 203 may send a MAC of the rule separately from the rule, for example, as a response from the rule verification module 112 the switch 10-1/10-2 to a request to send a MAC of the rule.

The rule verification module 112 of the switch 10-1/10-2 may retain the MAC sent from the controller 20 in association with the rule (rule ID) in the isolated execution environment 101, in order to prevent the rule from being compromised.

The key management unit 202 of the controller 20 may encrypt a secret key (symmetric key) generated by the key generation unit 201 using a public key opened to public by the switch 10 and delivers the encrypted secret key to the switch 10. The controller 20 communicates with and the switch 10 using OpenFlow channel.

The switch 10 decrypts the encrypted secret key delivered from the controller 20, using a private key of the switch 10-1/10-2. The monitoring module 111 verifies a packet that has been received by the switch 10-1/10-2 along with a MAC, using a decrypted secret key shared between a pair of switches 10-1 and 10-2.

The rule verification module 112 of the switch 10-1/10-2 verifies a MAC of a rule stored in the switch 10-1/10-2, using a decrypted secret key shared between the switch 10-1/10-2 and the controller 20. The rule verification module 112 of the switch 10-1/10-2 checks if the computed MAC matches a MAC of the rule that has been sent from the controller 20.

<Communication System>

FIG. 3 is a diagram schematically illustrating a communication system of a first exemplary embodiment of the disclosure. Referring to FIG. 3, there are provided a controller 20, a switch 10, a switch (SDN switch) A/BOX A 10A and end hosts 30-1 and 30-2. The controller 20 is connected to the switch 10, the switch A/BOX A 10A and end hosts 30-1 and 30-2. In FIG. 3, two switches are illustrated only for simplicity and the number of switches and that of end hosts are, as a matter of course, not limited to two.

The controller 20 may be configured as described with reference to FIG. 2. The controller 20 generates a secret key (symmetric key) shared between adjacent two parities. In a case of FIG. 3, for example, a secret key: K1 shared between the end host 30-1 and the switch 1; a secret key: K2 shared between the switch 10 and the switch A (BOX A) 10A; and a secret key: K3 shared between the switch A/BOX A 10A and the end host 30-2.

The controller 20 encrypts the generated secret key K1 using a public key pk1 that is opened to the public by the end host 30-1, and delivers the encrypted key ENC (pk1,K1) to the end host 30-1.

The end host 30-1 decrypts the encrypted key ENC(pk1, K1) using a private key sk1 that the end host 30-1 has, DEC (sk1, ENC(pk1,K1)) to obtain a secret key K1 used to generate a MAC of a packet to be forwarded to the switch 10.

The controller 20 encrypts the generated key K1 using a public key pk2 opened to the public by the switch 10 and delivers the encrypted key ENC (pk2, K1) to the switch 10. The switch 10 decrypts the encrypted key using a private key sk2 that the switch 10 has, DEC (sk2, ENC (pk1,K1)) to obtain a secret key K1 used to generate a MAC of a packet received from the end host 30-1.

Regarding keys: K2 shared between the switch 10 and the switch A/BOX A 10A, and K3 shared between the switch A/BOX A 10A and the end host 30-2, the same may be said.

The controller 20 generates a secret key (symmetric key) k1 and k2, respectively shared between the controller 20 and the switch 10, between the controller 20 and the switch 10A, each of the secret keys being used for generation and verification of a rule therebetween.

The controller 20 encrypts the generated secret key k1 using a public key pk2 that is opened to the public by the switch 10, and delivers the encrypted key ENC (pk1,k1) to the switch 10.

The switch 10 decrypts the encrypted key ENC (pk2,k1) using a private key sk2 that the switch 10 has, DEC (sk2, ENC(pk1,k1)) to obtain a secret key k1 used to verify s a MAC of a rule to which a received packet matches.

The controller 20 performs path computation for a flow by referring to network topology information stored in a storage device (208 in FIG. 2), on reception of a Packet-In message sent from the switch 10 or 10A. Based upon the computed path, the controller 20 generates a rule for each of switches disposed on the path and sends the generated rule for each of the switches disposed on the path using Flow_Mod message, for example.

The rule may be configured to include a match field that is matched to a packet header of a received packet and an action field that defines one or more actions applied to the packet when the packet has a header matched to the condition of the match field of the rule.

The controller 20 computes a MAC of the rule using a secret key k1 shared between the controller 20 and the switch 10 or 10A. The controller 20 sends the rule along with the computed MAC to the switch 10 or 10A that has sent the Packet-In message to the controller 20.

The switch 10 generates a MAC of the rule received from the controller using a secrete key K1 and checks whether if the MAC generated by the MAC algorithm is identical with the MAC received from the controller 20. If the MAC generated by the MAC algorithm is identical with the received MAC, the monitoring module 111 assumes that the packet has not been tampered during transmission from the controller 20 to the switch 10.

Each of the end hosts 30-1 and 30-2 includes a monitoring module 311 deployed in an isolated execution environment 31 and a packet forwarding engine 32 that performs layer 2 and layer 3 packet switching, route lookups, and packet forwarding. The packet forwarding engine 32 forwards packets between input and output interfaces.

The monitoring module 311 of the end host 30-1 generates a MAC of the packet destined to the end host 30-2 using a secrete key K1. The packet forwarding engine 32 forwards the packet +MAC to the output interface connected to the switch 10.

In FIG. 3, the switch 10 is configured as described with reference to FIG. 2. The switch 10 includes a monitoring module 111 and a rule verification module 112 that are both deployed in an isolated execution environment 11, and a packet forwarding engine 12.

The monitoring module 111 verifies a MAC (Message Authentication Code) of a packet received from the end host 30-1. The monitoring unit 111 executes a MAC algorithm for a message of a packet received using a key (K1) shared between the switch 10 and the end host 30-1 and checks whether if the MAC generated by the MAC algorithm is identical with the received MAC. If the MAC generated by the MAC algorithm is identical with the received MAC, the monitoring module 111 assumes that the packet has not been altered during transmission from the sender of the packet to the switch 10.

The rule verification module 112 generates a MAC of the rule received from the controller using a secret key K1 and checks whether if the MAC generated by the MAC algorithm is identical with the MAC received from the controller 20.

Box A may include NAT (network address translation) function, packet filtering, and so forth that changes at least one of information items of a header of a packet or frame, such as IP address, a port number, or tag conversion function that changes VLAD (Virtual LAN) ID. A switch A/Box A 10A is termed as a switch 10A.

The switch 10A includes a packet modification module 121 in addition to components included in the switch 10. The packet modification module 121 is allowed to modify header information of the received packet, based on the rule having a match field matching the header of the received packet and having an action field indicating packet modification, when the rule pass the verification of MAC by the rule verification module 112. The monitoring module 111 re-computes (updates) MAC of the packet modified by packet modification module 121.

In FIG. 3, the packet forwarding engine 12 forwards the modified packet along with the MAC (Modified Packet+ MAC) to the output interface connected to the end host 30-2 based on the rule that has been verified by the rule verification module 112.

Box A may include NAT (network address translation) function, packet filtering, and so forth that changes at least one of information items of a header of a packet or frame, such as IP address, a port number, or tag conversion function that changes VLAD ID. Box A or SDN switch A 10A is termed as a switch 10A.

The switch 10A includes a packet modification module 121 in addition to components included in the switch 10. The packet modification module 121 modifies header information of the received packet based on the rule having a match field matching the header of the received packet and having an action field indicating packet modification.

In FIG. 3, the packet forwarding engine 12 forwards the modified packet +MAC to the output interface connected to the end host 30-2, based on the rule that has been verified by the rule verification module 112.

The following describes operation of the system of FIG. 3.

<Initial Key Setup>

The controller 20 (or a network administrator) has public keys of al switches 10 and 10A. All switches 10 and 10A each have a public key of the controller 20. These public keys may be installed manually when the switches 10 and 10A are physically deployed by an network administrator.

<Keys for Packet Verification>

The controller 20 generates a symmetric key K(i,j) shared between switches i and j. The controller 20 distributes the key K(i,j) to an adjacent pair of switches i and j. As described above, the controller 20 also generates a symmetric key shared between the switch (edge switch) and the end host.

The controller 20 distributes the key securely to the switches i and j using public keys of the switches i and j. The controller 20 encrypts the key K(i,j) using public keys pk1 and pk2 of the switches i and j:

$$CK1=ENC(pk1,K(i,j))$$

$$CK2=ENC(pk2,K(i,j))$$

and sends the encrypted key CK1 and CK2 respectively to the switch i and the switch j. The controller 20 also distributes a symmetric key shared between the switch 10/10A and the end host 30-1/30-2 to the switch 10/10A and the end host 30-1/30-2, when it assumed that the switch 10/10A is an edge switch connected to the end host 30-1/30-2.

The switches i and j decrypt the encrypted key using respective private keys sk1 and sk2 of the switches i and j to obtain the key K(i,j).

Key(i,j)=DEC(sk1,CK1)

Key(i,j)=DEC(sk2,CK2)

The end host 30-1/30-2 decrypts the encrypted key using respective private keys of the end host 30-1/30-2 to obtain the secret key shared between the switch 10/10A and the end host 30-1/30-2.

The key K(i,j) is used by one of the switches i and j that sender a packet to generate a MAC. The other one of the switches i and j that receives the packet along with the MAC uses the key K(i,j) to compute a MAC for verification of a received packet.

An adjacent pair of switches i, j (10 and 10A in FIG. 3) may exchange keys using Diffie-Hellman key exchange (RFC (Request for Comments) 2631). A large prime number p and a number g that is a generator of cyclic group $Z/pZ=\{0,1, \ldots, p-1\}$ are opened to the public. The residual ring Z/pZ has the operation of residues which occurs from a division by modulo p. The switches i and j have respective secrete numbers a and b selected randomly between 0 and p−2. The switch i computes A=g^a mod p and sends A to the switch j and the switch j computes B=g^b mod p and sends B to the switch i. The switch i computes KA=B^a mod p, while the switch j computes KB=A^b mod p. KA=B^a mod={g^(b)}^a mod={g^a}^b mod p=KB, where the key KA and KB are used as symmetric key by the switches i and j. Keys KA and KB may be used by the adjacent pair of the switches to generate and verify MAC of a packet. An adjacent pair of the switch 10/10A and end host 30-1/30-2 in FIG. 3 may also exchange keys using Diffie-Hellman key exchange when it assumed that the switch 10/10A is an edge switch connected to the end host 30-1/30-2. The adjacent pair of the switches that have exchanged keys may inform the controller 20 of the keys. The controller 20 may retain the keys in association with node IDs of the adjacent pair of the switches.

The switches (10 and 10A in FIG. 3) may generate keys from a master key. The controller (20 in FIG. 3) distributes a master key MK to the switches. Here, the controller 20 may encrypt the master key MK using respective public keys of the switches to distribute the encrypted master key to the switches. The switches decrypt the encrypted master key received from the controller 20, using respective secret keys of the switches.

Then, an adjacent pair of switches i and j (10 and 10A in FIG. 3) may generate a symmetric Key(i,j) shared between the switches i and j and used to compute MACs of packets, using a key derivation function kdf that derives a secret key from the master key, or a password using a pseudo-random function.

Key(i,j)=kdf(MK,ID(i),ID(j)) if ID(i)>ID(j)

Key(i,j)=kdf(MK,ID(j),ID(i)) if ID(i)<ID(j)

Here, ID(i) and ID(j) denote switch IDs of switch i and switch j respectively.

The controller 20 and the switch i may also generate a symmetric key(c,i) shared between the controller and the switch I, from the master key MK.

Key(c,i)=kdf(MK,ID(i))

In case that end host 30-1/30-2 or the switch 10/10A wants to perform encryption of a packet in order to ensure confidentiality, the end host 30-1/30-3 or the switch 10/10A may be so configured to generate a key for encryption from the master key using a key derivation function kdf.

Encryption key=kdf(MK,"D")

Note that "D" is a string to stretch the key in which an arbitrary string can be used.

A group key agreement protocol that enables switches more than two share a secret key may be used for distributing a secret key for generation and verification of a MAC, as a matter of course.

<Keys for Rule Verification>

The controller 20 generates a symmetric key k(c, i) shared between the controller and with switch i (i=1 . . . N). N is the number of switches (there are shown two switches 10 and 10A in FIG. 3). This key k(c, i) is used for MAC calculation and verification of a rule. The key k(c, i) may be also used for encryption of a statistics report sent from the switch i to the controller 20. The key k(c, i) can also be securely distributed using the public key pki of the switch i.

The controller 20 sends the encrypted key ENC(pki, k(c,i)) to the switch i. On reception of the encrypted key, the switch i decrypts encrypted key ENC(pki, k(c,i)) using a private key ski of the switch i to obtain a symmetric key k(c,i) shared between the controller 20 and the switch I for generation and verification of a MAC of the rule.

<Switch Architecture>

FIG. 4 schematically illustrates an arrangement of the switch 10 in FIG. 3. Referring to FIG. 4, the switch 10 includes an isolated execution environment 11 and packet forwarding engine 12, a rule database 13 and a network stack 15.

The isolated execution environment 11 includes a monitoring module 111, a rule verification module 112 and a key management function 116.

The network stack 15 includes one or more NICs (Network Interface Cards) and a network driver software, for example. The network stack 15 has NICs connected to at least adjacent nodes (previous node and next nodes) and the controller 20.

The rule database 13 is a storage in which rules supplied from the controller are stored. The rule database 13 corresponds to a flow table of OpenFlow switch.

The packet forwarding engine 12 receives a packets from the NIC and looks up the rule database 13. The packet forwarding engine 12 calls or invokes the isolated execution environment 11.

The key management function 116 in the isolated execution environment 11 obtains keys distributed by the controller 20. The keys distributed from the controller 20 includes:

a first key used to verify a MAC of a received packet from a previous node;

a second key used to generate a MAC of a packet to be forwarded to a next node; and a third key used to verify a MAC of a rule received from the controller 20.

The key management function 116 may retain and manage keys distributed from the controller 20 in a safely protected manner in the isolated execution environment 11.

The monitoring module 111 includes a MAC verification function 113 configured to verify a MAC attached with a received packet using the first key; and a MAC update function 114 configured to update the MAC using the second key shared between the next switch and the switch 10. The MAC updated by the MAC update function 114 is sent along with the packet to the next node via the packet forwarding engine 12 and the network stack 15 to the next node. The key management function 116 provides corresponding secret keys to the MAC verification function 113 and the MAC update function for verification and generation of the MAC for the packet.

The rule verification module 112 includes a rule verification function 115 configured to verify a rule in order to ensure that a packet is forwarded according to a valid rule. Specifically, the controller 20 generates a MAC to verify a rule using a key shared between the switch 10 and the controller 20. The rule verification function 115 verifies the rule by computing a MAC using a key to check the equality of the MAC computed over the rule and the MAC sent along with the rule from the controller 20. The key management function 116 provides a corresponding secret key to the rule verification function 115 for verification of the MAC for the rule.

The rule that has been verified by the rule verification module 112 may be stored in the rule database 13 that is referenced by packet forwarding engine 12. That is, the packet forwarding engine 12 looks up rules in the rule database 13 when the packet forwarding engine 12 receives a packet from a sender (pervious node) in order to find a rule that matches the packet.

The rule includes a match and a corresponding action. A match is expressed through specific values (or "don't care" wild card values) on fields within a packet header, such that a match identifies a flow for packet. Though not limited thereto, a flow match statement (condition) may include, for instance, a match on source IP address or MAC address being X, being in range [X1, X2], and/or destination IP address or MAC address being specified or within a range, the protocol being TCP (Transmission Control Protocol) or UDP (User Datagram Protocol), and/or the TCP or UDP source or destination ports having some value or falling in some range, or wild card.

<Packet Forwarding Procedure>

The following describes the packet forwarding procedure in the switch 10 of FIG. 4 with reference to FIG. 5.

<Step S1>

On reception of a packet, the packet forwarding engine 12 performs looks up a rule that matches header information of the received packet with reference to the rule database 13.

<Step S2>

If an action of the rule matching header information of the received packet specifies forwarding packet ("Yes" branch of Step S2A), the packet forwarding engine 12 invokes the isolated execution environment 11 and supplies the received packet and the matched rule to the isolated execution environment 11 (Step S2B). The packet forwarding engine 12 also gives the previous switch information so that the monitoring module 111 can determine the key used for packet verification.

<Step S3>

The MAC verification function 113 of the monitoring module 111 performs verification of the MAC of the received packet using a symmetric key shared with the previous switch. If verification of the MAC has been failed, the MAC verification function 113 may return an error code to the packet forwarding engine 12. In this case, the packet forwarding engine 12 does not perform forwarding of the received packet. The order of Step S3 does not necessarily follow Step S2. Steps S2 and S3 may be swapped in order.

<Step S4>

If the received packet passes the verification (verification Okay), the rule verification function 115 verifies the MAC of the matched rule using a symmetric key shared between the controller 20 and the switch 10. If the MAC computed on the matched rule and the MAC received from the controller 20 is identical, the followings step 5 is executed by the MAC update function 114. In Step S4, the rule verification function 115 may compute a MAC of the matched rule and compares the computed MAC and the MAC that has sent along with the rule from the controller 20 and retained in the isolated execution environment 11. Alternatively, the rule verification function 115 may issue a request to send a MAC for the matched rule to the controller 20, by specifying a rule ID and the node ID (switch ID) of the switch 10 and the controller 20 may return the MAC of the relevant rule or the MAC of the relevant rule along with of the relevant rule. If the MAC computed on the matched rule and the MAC sent from the controller 20 is not identical (verification NG (wrong)), the processing may be jumped to Step S8.

<Step S5>

The MAC update function 114 re-computes (updates) a MAC of the packet using a symmetric key shared with the next switch. Here, the next switch is determined according to the rule that pass the verification in Step S4.

<Step S6>

Then, the isolated execution environment 11 returns the packet along with the updated MAC to the packet forwarding engine 12. The isolated execution environment 11 also may inform the packet forwarding engine 12 that the rule matching the received packet has passed the verification performed by the rule verification function 115.

<Step S7>

The packet forwarding engine 12 outputs the packet along with the updated MAC to the specified port specified in the matched rule that has passed the verification performed by the rule verification function 115.

<Step S8>

The packet forwarding engine 12 repeats the above Steps S1 to S7 for rest rules. The packet forwarding engine 12 checks another rule left to be retrieved in the rule database 13 and if some another rule is left, jump to Step S1 is performed. FIG. 5 illustrates an example of the packet forwarding procedure in the switch 10 in FIG. 4, wherein the packet forwarding engine 12 provides the received packet and the rule that matches the received packet to the isolated execution environment 11. Regarding the packet forwarding procedure, such a variation may be practiced in which the verification of MAC of a received packet by the monitoring module 111 in Step S3, may be relocated in a position before Step S1 (finding a rule matching the received packet). In this case, the packet forwarding engine 12 may invoke the isolated execution environment 11 and provide the received packet to the monitoring module 111 deployed in the isolated execution environment 11. After the received packet passes verification of MAC by the monitoring module 111, the packet forwarding engine 12 may execute Step S1 (finding a rule matching the received packet) in FIG. 5 and provide the rule matching the received packet to the rule verification module 112 deployed in the isolated execution environment 11.

<Switch Architecture with a Packet Modification Module>

FIG. 6 illustrates a switch 10A of FIG. 3. Referring to FIG. 6, in the switch 10A, the isolated execution environment 11A includes a packet modification module 121 in addition to the monitoring module 111 and rule verification module 112. The packet modification module 121 is configured to modify a packet, such as, header information of a received packet, based on a rule that is found to match the received packet by the packet forwarding engine 12.

It is assumed that the action filed of the rule specifies modify-field, that is, modification of header field of a received packet such as source/destination IP address field or VLAN (Virtual LAN (Local Area Network)) tag. The packet forwarding engine 12 performs retrieval of a rule that matches header information of a received packet with reference to the rule database 13. If the action field of the matched rule specifies modify-field, the packet forwarding engine 12 supplies the received packet and the matched rule to the isolated execution environment 11A.

The monitoring module 111 performs verification of the MAC of the received packet. The packet modification module 121 performs verification of the MAC of the matched rule. If the verification of MAC succeeds, the packet modification module 121 performs modification of a header filed of the received packet based on the action of the matched rule. The MAC update function 114 computes the MAC of the packet and the packet forward engine 12 forward the packet along with the updated MAC.

<Packet Forwarding Procedure>

The following describes the packet forwarding procedure in the switch 10A of FIG. 6 with reference to FIG. 7.

<Step S11>

The packet forwarding engine 12 receives a packet, then packet forwarding engine 12 and performs lookup of the rule database 13.

<Step S12>

If a matched rule specifies packet modification ("Yes" branch of Step 12A), the packet forwarding engine 12 invokes the isolated execution environment and supplies the packet and the matched rule to the isolated execution environment.

<Step S13>

The monitoring module 111 performs verification of the MAC of the received packet. If verification of the MAC has been failed, the MAC verification function 113 may return an error code to the packet forwarding engine 12. In this case, the packet forwarding engine 12 does not perform forwarding of the received packet.

<Step S14>

If the received packet passes the verification (verification OK), the rule verification function 115 verifies the matched rule using a symmetric key shared between the controller 20 and the switch 10. The rule verification function 115 verifies the rule given by the packet forwarding engine 12 by checking the MAC of the rule using a key shared between the controller 20 and the switch 10A. The rule verification function 115 computes MAC of the rule using the key and compares the computed MAC and MAC computed by the controller 20 for the rule. If the MAC computed on the matched rule and the MAC sent from the controller 20 is not identical (verification NG (wrong)), the processing may be jumped to Step S18. Step S14 and Step S13 may be swapped in order.

<Step S15>

The packet modification module 121 checks whether or not the matching condition of the rule actually matches the received packet (Step S15A). If the matching condition of the rule actually matches the received packet, the packet modification function 122 performs modification of the packet according to the rule (Step S15B). If the matching condition of the rule actually does not match the received packet, the jump to step S8 is preformed and some error code may be returned to the packet forwarding engine 12.

<Step S16>

The monitoring module 111 updates the MAC of the received packet.

<Step S17>

Then the isolated execution environment 11 returns the packet to the packet forwarding engine 12.

<Step S18>

The packet forwarding engine 12 outputs the packet to the specified port. The packet forwarding engine 12 may check another rule left to be retrieved in the rule database 13 and if some another rule is left, jump to Step S11 may be performed as same with FIG. 5. Such a variation in which the verification of MAC of a received packet by the monitoring module 111 in Step S13, may be relocated in a position before Step S11 (finding a rule matching the received packet).

<Packet Injection>

OpenFlow protocol supports a Packet_Out message that makes a switch send a packet. The controller 20 can inject a packet into a data plane of a particular switch. FIG. 8 schematically illustrates packet injection according to the first exemplary embodiment.

Packet_Out message includes a header and buffer_id field indicating location of a raw packet to be injected into the data plane of the switch, in_port field, actions_len indicating the number of bytes a set of actions consume, action[ ] field that is a list of actions to apply to the raw packet, and data[ ] field that is a byte array to contain a raw packet.

Packet_Out message can either carry a raw packet to inject into the switch, or indicate a local buffer on the switch containing a raw packet to release. Buffer_id of a value of 0xffffffff indicates that the raw packet is contained within the byte array data[ ], otherwise the buffer_id value indicates a packet buffer local to the switch that contains the raw packet.

The packet_out message carries both the packet and a MAC. The switch 10-1 forwards the packet contained in the Packet_Out message, from a port specified by the Packet_Out message. The packet should also have the MAC contained in the Packet_Out message so that next switch can verify the MAC.

In order to avoid additional functions in the isolated execution environment on the switch, the controller 20 calculates the MAC of the packet using the key of the next switch 10-2.

The next switch 10-2 computes a MAC for the packet forwarded from the switch 10-1 using a key shared with the controller 20 and checks the equality of the computed MAC and the MAC sent along with the packet from the switch 10-1.

The controller 20 has all per-neighbor keys. In this case, a key used by the controller 20 to calculate a MAC of a packet that is contained in the Packt_Out message and a key used by the switch 10-2 to verify MAC.

<Packet Dropping>

The isolated execution environment 11 of the switch 10 periodically may send a statistics report of the rule to the controller 20 so that the controller 20 can detect packet dropping by comparing the statistics.

Packet drop is also performed in the isolated execution environment 11 so that the controller 20 can distinguish a legitimate action or packet dropping by a malicious switch.

Similar to the packet modification, the packet forwarding engine 12 gives the isolated execution environment 11 a received packet and a rule that the matches the header of the packet and that has an action field indicating to drop packet. In a flow entry of OpenFlow, there is no explicit action to represent drop.

Instead, a packet whose action sets have no output actions should be dropped. This result could come from empty instruction sets or empty action buckets or after execution of a clear-actions instruction. It is as a matter of course, the action filed of the rule indicate explicitly packet dropping.

The rule verification module 112 performs verification of the MAC of the rule indicating packet dropping. The rule verification module 112 computes a MAC of the rule and compares the computed MAC with a MAC sent from the controller 20. When the MACs are the same, the packet modification module 121 drops the packet.

<Rule Distribution>

FIG. 9 illustrates a second exemplary embodiment. Referring to FIG. 9, the switch 10B includes further a rule management component 14 in addition to the configuration of the switch 10B described with reference to FIG. 6. The description of other components in the switch 10A is omitted for avoidance of duplication.

The rule management component 14 receives one or more rules sent from the controller 20 and registers the rules in the rule database 13. The rule database 13 may store rules (flow entries) in a flow table format, as in case of OpenFlow. A channel between the rule management component 14 and the controller 20 is OpenFlow channel.

The rule management component 14 is deployed outside the isolated execution environment 11. This arrangement contributes to prevent an increase in code, a size of programs running in the isolated execution environment 11.

A policy is such that when a plurality of rules in the rule database 13 match a packet header, a rule having the highest priority should be applied to the packet. The packet forwarding engine 12 provides the packet and the rule of the highest priority to the isolated execution environment 11. The rule management component 14 my retain priority to rules in the rule database 13, as set from the controller 20.

<Caches of Flow Entries>

Some software switch implementations use caches of flow entries to improve the performance. For example, Open vSwitch generates an exact match entry from an entry with wildcard when the Open vSwitch receives a first packet. The cache entry does not have a valid MAC because the MAC is not generated by the controller. The Open vSwitch is a production-quality open-source implementation of a distributed virtual multilayer switch. The Open vSwitch may be implemented as a virtual switch on a hypervisor.

To give an original entry to the rule verification module 112, the cache entry may have a link to the original entry. When the cache entry matches a received packet, the packet forwarding engine 12 gets the original entry by referring the link and gives the original entry to the rule verification module 112.

Alternatively, the rule verification module 112 may generate a MAC of the cache entry. First, the packet forwarding engine 12 gives the packet and the original entry to the isolated execution environment 11A, then the rule verification module 112 generates an exact match cache entry and its MAC using its own key. The rule verification module 112 returns the cache entry and its MAC to the packet forwarding engine 12. The packet forwarding engine 12 gives the cache entry and its MAC to the rule verification module 112, when the cache entry matches a packet.

<Counter>

In addition to a MAC, the monitoring module 111 may add a counter to the packet. The counter is incremented packet by packet. Using the counter, a next switch can check packet dropping, packet duplication, and packet reordering. For example, when the switch receives the same counter values, the monitoring module 111 assumes packet duplication happens. Also, when a counter value is missing, it is assumed that packet drop happens. Moreover, the packet reordering can be detected by checking order of the counters.

To protect the counter, the MAC of the packet can be computed over the counter in addition to packet header and payload.

<Ensuring Rule Priority>

There may be a case wherein a malicious code outside the isolated execution environment 11 may give a low priority rule to the isolated execution environment 11.

The following attack (priority spoofing attack) is assumed as an example. A malicious (compromised) packet forwarding engine 12 may provide a low priority rule to the isolated execution environment 11. This may lead to violation of a decision controller 20.

In this case, since the low priority rule has a valid MAC, the MAC verification function 113 cannot detect the attack.

The exemplary embodiment can provide the following solution to prevent the priority spoofing attack.

A root of cause of this priority spoofing attack is that multiple rules match a packet. If only one rule matches the packet, an adversary cannot perform this attack.

Therefore, the controller 20 (rule management unit 203 in FIG. 2) may remove overlap in a rule by splitting the rule into non-overlapping rules.

<Solution Example A>

FIG. 10 illustrates an example A wherein a low priority rule overlapping with a high priority rule is divided into a plurality of non-overlapping rules (rule 1 and rule 2).

It is assumed that there are provided a high priority rule having a match condition: IP address=192.168.0.16~31 and a low priority rule having a match condition: IP address=192.168.0.0~63.

A high priority rule and a low priority rule match a packet with a header of destination IP address=192.168.0.20, for example. The low priority rule is divided into rules 1 and 2 having match conditions: IP address=192.168.0.0~15 and IP address=192.168.0.32~63 that does not overlap with that of the high priority rule.

The rules 1 and 2 do not match the packet anymore and only one rule (high priority rule) matches the packet. Thus, an adversary cannot perform the priority spoofing attack.

<Solution Example B>

FIG. 11 illustrates an example B wherein shrink the match condition of the low priority rule. It is assumed that there are provided a high priority rule having a match condition: IP address=192.168.0.16~31 and a low priority rule having a match condition: IP address=192.168.0.0~63 that overlaps with the high priority rule. In FIG. 11, a low priority rule having a match condition: IP address=192.168.0.16~15 gets a range narrowed down to 192.168.0.32~61 that does not overlap with the high priority rule.

<Solution Example C>

FIG. 12 illustrates an example C wherein the low priority rule is deleted if unnecessary. It is assumed that there are provided a high priority rule having a match condition: IP address=192.168.0.16~31 and a low priority rule having a match condition: IP address=192.168.0.0~63 that overlaps with the high priority rule. A range of the IP address of the high priority rule includes a range of the low priority rule. In this case, one approach to resolve overlapping of the low priority rule with the high priority rule is to delete the low priority rule.

<Malicious Edge Switches>

The isolated execution environment such as SGX does not provide secure input/output channels to devices such as NICs. Thus, an adversary can detour the monitoring module of an edge switch, when a network stack of the switch is compromised. This attack allows data exfiltration. Data exfiltration is an unauthorized transfer of information data from a target's network to a location which adversary controls.

<Data Exfiltration>

FIG. 13 illustrates data exfiltration. The compromised packet forwarding engine 12 of the malicious edge switch forwards a packet received from an end host 30 or switch 10 to an end host 30-2 of an attacker.

Furthermore, the compromised network stack (15 in FIGS. 4, 6 and 9) can modify an inbound packet before the monitoring module 111 checks the packet. These attacks cannot be detected and prevented because there is no enforcement point between the edge switch and the end host.

There are three options to prevent the attacks by the malicious edge switch, link encryption, end-to-end encryption and small box, <Solution 1: Link Encryption>

To avoid attacks by the malicious edge switch, link encryption is introduced as illustrated in FIG. 14.

a) A link between an edge switch and an end host.

b) A link between an edge switch and its neighbor switch.

In the case of link encryption between the edge switch 10 and the end host 30, the edge switch 10 includes a link encryption module 120 deployed in the isolated execution environment 11. The link encryption module 120 encrypts a packet to be forwarded to an end host 30.

The end host 30 includes a link encryption module 33 that decrypts a packet from a packet forwarding engine 32 that has received the packet from the edge switch 10, and provides the decrypted packet data to an application 34. The link encryption module 33 encrypts a packet data from the application 34 and provides the encrypted packet data to the packet forwarding engine 32. A header portion of the packet is not encrypted. The packet forwarding engine 32 of the end host 30 forwards the encrypted packet to the edge switch 10. The packet forwarding engine 12 of the edge switch 10 looks up rules stored therein to find a rule that matches a header of the packet received and provides the packet to the link encryption module 120. The link encryption module 120 decrypts the encrypted packet supplied from the packet forwarding engine 12 that receives the packet from the end host 30 and provides the decrypted packet to the monitoring module 111 in the isolated execution environment 11.

In the case of link encryption between the edge switch 10 and its neighbor switch (not shown), the link encryption module 120 of the edge switch 10 may encrypt a packet supplied from the monitoring module 111 that verifies the packet and provide the encrypted packet to the packet forwarding engine 12. The packet forwarding engine 12 may forward the encrypted packet along with a MAC computed by the monitoring module 111 to the neighbor switch, according to a rule having a MAC thereof verified. The link encryption module 120 may decrypt an encrypted packet supplied from the packet forwarding engine 12 that has received the packet from the neighbor switch to provide the decrypted packet to the monitoring module 111 in the isolated execution environment 11. A sender of a packet may encrypt the packet using a public key of a recipient and the recipient may decrypt the packet using a private key of the recipient. Or, the sender and recipient may encrypt and decrypt the packet using symmetric keys.

As illustrated in FIG. 15, the end host 30 also may have an isolated execution module 31. A link encryption module 33 is deployed in the isolated execution environment 31. Link encryption key and the encryption algorithm are protected in the isolated execution environment 31.

<Solution 2: End-to-End Encryption>

End-to-end encryption (E2EE) is a system or scheme for implementing secure communication that is enabled to prevent a third-party from accessing data, while the data is transferred from one end (source) to the other end (destination). In end-to-end encryption, the source encrypts data with an encryption key and the encrypted data is not decrypted until the encrypted data safely reaches the destination. A source end host may perform encryption in the isolated execution environment to protect an encryption key. End-to-end encryption can implement security at an application layer so that data such as PIN (Personal Identification Number) and password are not exposed at any intermediate nodes between an application (such as a browser, for example) on one end host and the other end host.

<Solution 3: Small Box>

Instead of the encryption, a small box can be deployed on the border of the network (e.g., on the border between Intranet and Internet). FIG. 16 illustrates an arrangement of a small box. FIG. 16 illustrates an arrangement of a small (or box) 50 deployed between an edge switch 10 and an end host 30.

The box 50 includes a monitoring module 511 in an isolated execution environment 51 to verify a MAC of a packet that traverse the box 50. The box 50 is connected to the controller 20. The controller distributes secret keys shared between the edge switch 10 and the box and between the box and the end host 30.

It is assumed that the compromised network stack (15 in FIGS. 4, 6 and 9) or packet forwarding engine 12 in the edge switch 10 modifies a packet before the monitoring module 111 checks the packet to forward the packet to the end host 30. The edge switch 10 detours the monitoring module 111. The packet forwarding engine 12 forwards the packet along with a MAC to the end host 30 without providing the packet and the MAC to the monitoring module 111. The box 50 captures the packet along with MAC forwarded from the edge switch 10 and verifies the MAC of the packet.

Since the MAC received by the box 50 from the edge switch 10 is not generated by the monitoring module 111 of the switch 10, the MAC is different from a MAC that is computed for the received packet by the monitoring module 511 of the box 50 and the verification of the received packet fails. The box 50 does not forward the packet received from the edge switch 10 to the end host 30. If the box 50 is omitted, the modified packet from the edge switch 10 may be forwarded to the end host 30.

This solution does not require the isolated execution environment such as SGX on the end host 30.

<Computer Program Implementation>

FIG. 17 illustrates a further exemplary embodiment where a part or an entirety of the processing of the communication apparatus 100 in FIG. 1 or the switch 20 or 20A in FIG. 2 or FIG. 3 may be implemented based on a software program(s) running on a computer (processor). Or, a part or an entirety of the processing of the units 201-2-6 of the controller 20 in FIG. 2 may be implemented by a software program(s) running on a computer (processor). In this case, the processor 200 in FIG. 2 corresponds to a processor 401 in FIG. 15.

The computer system 400 includes a processor 401, a memory 402, and a network interface device 404 that includes a transmitter 405 and a receiver 406. The memory may include a semiconductor storage device such as read only memory (ROM), a random access memory (RAM), or electrically and erasable programmable read only memory (EEPROM), a hard disk drive (HDD), a compact disc (CD)

or a digital versatile disc (DVD) in which a program to cause the processor 401 to execute process of the communication apparatus 100, the switches 10 or 10A, or the controller 20 as described with reference to FIG. 1, FIG. 2 or FIG. 3.

In the above exemplary embodiments, examples of application to switch and controller are described, but application of the present invention is, as a matter of course, not limited only to SDN or OpenFlow network. The exemplary embodiments are not limited to a system using MAC as authentication information but may well be applied to authentication or attestation information generated using for example, a cryptographic key, password or the like.

Each disclosure of the above-listed Patent Literature and Non Patent Literatures is incorporated herein by reference. Modification and adjustment of each exemplary embodiment and each example are possible within the scope of the overall disclosure (including the claims) of the present invention and based on the basic technical concept of the present invention. Various combinations and selections of various disclosed elements (including each element in each Supplementary Note, each element in each example, each element in each drawing, and the like) are possible within the scope of the claims of the present invention. That is, the present invention naturally includes various variations and modifications that could be made by those skilled in the art according to the overall disclosure including the claims and the technical concept.

What is claimed is:

1. A communication apparatus comprising:
a processor; and
a memory storing program instructions executable by the processor, wherein the processor is configured to perform
a monitoring process configured to verify authentication information of a packet that has been received; and
a rule verification process configured to verify authentication information of a rule that matches the packet, wherein
the monitoring process generates authentication information for the packet that is to be forwarded according to the rule having the authentication information that has been verified, wherein the processor is further configured to perform
a packet forwarding process configured to receive the packet, look up rules stored in the communication apparatus to find the rule that matches the packet, and provide the packet and the rule that matches the packet to the monitoring process and the rule verification process, respectively,
wherein when the authentication information of both the packet and the rule have been verified, the monitoring process generates the authentication information for the packet, and
the packet forwarding process forwards to a next node the packet along with the authentication information that has been generated, according to the rule.

2. The communication apparatus according to claim 1, wherein the processor is configured to provide an isolated execution environment in the communication apparatus and execute
at least one of the monitoring process and the rule verification process deployed in the isolated execution environment.

3. The communication apparatus according to claim 1, wherein the processor is further configured to perform a packet modification process configured to modify the packet according to the rule indicating packet modification and having the authentication information that has been verified.

4. The communication apparatus according to claim 3, wherein the processor is configured to provide an isolated execution environment in the communication apparatus and execute the packet modification process deployed in the isolated execution environment.

5. The communication apparatus according to claim 1, further comprising
a rule database that stores the rules,
wherein the processor is configured to manage the rules stored in the rule database.

6. The communication apparatus according to claim 5, wherein the rule database stores the rules such that overlapping rules are removed.

7. The communication apparatus according to claim 1, wherein the communication apparatus includes
a first switch that forwards the packet that has been received based on the rule,
a second switch that forwards the packet that has been received based on the rule and that is to modify the packet, or
a middle box.

8. A communication system comprising:
a controller; and
a plurality of network elements, wherein
each network element includes:
a processor; and
a memory storing program instructions executable by the processor; wherein the processor is configured to perform
a monitoring process configured to verify authentication information of a packet that has been received; and
a rule verification process configured to verify authentication information of a rule that matches the packet, wherein
the monitoring process generates authentication information for the packet to be forwarded according to the rule having the authentication information that has been verified,
wherein the processor is further configured to perform
a packet forwarding process configured to receive the packet, look up rules stored in a communication apparatus to find the rule that matches the packet, and provide the packet and the rule that matches the packet to the monitoring process and the rule verification process, respectively,
wherein when the authentication information of both the packet and the rule have been verified, the monitoring process generates the authentication information of the packet, and
the packet forwarding process forwards to a next node the packet along with the authentication information that has been generated, according to the rule.

9. The communication system according to claim 8, wherein the processor is a first processor, the memory is a first memory, the program instructions are first program instructions, and the controller includes
a second processor; and
a second memory storing second program instructions executable by the second processor, wherein the second processor is configured to perform
a key generation process configured to generate a first secret key shared by a pair of network elements respectively forming a first sender and a first receiver of the packet and used for generation and verification of the authentication information of the packet by the first sender and the first receiver, respectively, the key generation process is further configured to generate a second secret key shared by the controller and the network element respectively forming a second sender and a second receiver of the rule and used for generation and verification of the authentication information of the rule by the controller and the network element forming the second receiver, respectively;

a rule generation process configured to generate the rule for the network element forming the second receiver;

a rule management process configured to generate the authentication information for the rule that has been generated using the second secret key shared by the controller and the network element forming the second receiver; and a rule delivery process that sends the rule along with the authentication information of the rule to the network element forming the second receiver.

10. The communication system according to claim 8, wherein the controller computes the authentication information of the packet to be injected and sends the packet along with the authentication information to a first network element out of the network elements, the first network element forwarding the packet along with the authentication information to a second network element out of the network elements without generating authentication information of the packet, the second network element performing verification of the packet using a secret key shared between the controller and the second network element.

11. The communication system according to claim 8, comprising:

an edge network element connected to an end host, with at least one of a first link between the edge network element and the end host being encrypted, and a second link between the edge network element and a neighboring network element being encrypted.

12. The communication system according to claim 8, comprising an end host connected an edge network element and configured to perform end-to-end encryption (E2EE).

13. The communication system according to claim 8, comprising a box deployed between an edge network element and an end host facing the edge network element, the box including a monitoring configured to verify the authentication information of the packet received from the edge network element, and generate the authentication information of the packet.

14. A controller that controls a plurality of network elements, comprising:

a processor; and a memory storing program instructions executable by the processor, wherein the processor is configured to perform a key generation process configured to generate a first secret key shared by a pair of network elements forming a first sender and a first receiver of a packet and used for generation and verification of authentication information of the packet by the sender and the receiver, respectively, the key generation process generating a second secret key shared by the controller and the network element forming a second sender and a second receiver of a rule and used for generation and verification of the authentication information of the rule by the controller and the network element, respectively;

a rule generation process configured to generate a rule for the network element forming the second receiver;

a rule management process configured to generate the authentication information for the rule that has been generated using the second secret key shared by the controller and the network element forming the second receiver; and a rule delivery process that sends the rule along with the authentication information to the network element forming the second receiver, the network element forming the second receiver verifying the authentication information of the packet that has been received and verifying the authentication information of the rule that matches the packet, the network element forming the second receiver generating the authentication information for the packet to be forwarded according to the rule having authentication information verified, wherein the rule management process is configured to remove overlapping rules stored in a rule database, by splitting one of the overlapping rules into a plurality of non-overlapping rules, shrinking the one of the overlapping rules, or deleting the one of the overlapping rules, and the rule delivery process sends the nonoverlapping rules along a Message Authentication Code (MAC) to the network element forming the second receiver.

15. A communication method for a network element, comprising:

a monitoring process verifying authentication information of a packet that has been received;

a rule verification process verifying authentication information of a rule that matches the packet, the rule being sent from a controller to the network element;

the monitoring process generating authentication information of the packet; and a packet forwarding process forwarding the packet along with the authentication information of the packet that has been generated based on the rule having the authentication information that has been verified, the communication method further comprising:

receiving the packet, looking up rules stored in a storage to find the rule that matches the packet, and providing the packet and the rule that matches the packet to the monitoring process and the rule verification process, respectively;

when the authentication information of both the packet and the rule have been verified, the monitoring process generating authentication information of the packet; and the packet forwarding process forwarding to a next node the packet along with the authentication information that has been generated, according to the rule.

16. The communication method according to claim 15, comprising:

modifying the packet based on the rule that matches the packet and that indicates packet modification when the authentication information of the rule has been verified.

17. A non-transitory computer-readable recording medium storing a program causing a computer to execute processing comprising:

a monitoring process verifying authentication information of a packet received;

a rule verification process verifying authentication information of a rule that matches the packet; and the monitoring process generating the authentication information for the packet to be forwarded according to the rule having the authentication information that has been verified, the processing further comprising:

receiving the packet, looking up rules stored in a storage to find the rule that matches the packet, and providing the packet and the rule that matches the packet to the monitoring process and the rule verification process, respectively;

when the authentication information of both the packet and the rule have been verified, the monitoring process generating the authentication information of the packet; and a packet forwarding process forwarding to a next node the packet along with the authentication information that has been generated, according to the rule.

\* \* \* \* \*